(12) United States Patent
Almahmoud et al.

(10) Patent No.: US 12,496,569 B1
(45) Date of Patent: Dec. 16, 2025

(54) COBALT OXIDE AND NICKEL OXIDE DOPED MAGNESIUM ALUMINUM OXIDE (CoO—NiO@MgAl$_2$O$_4$) NANOCOMPOSITE FOR DYE REMOVAL FROM WATER

(71) Applicant: IMAM MOHAMMAD IBN SAUD ISLAMIC UNIVERSITY, Riyadh (SA)

(72) Inventors: Sondos Abdullah J Almahmoud, Riyadh (SA); Soad Saad Ahmed Alzahrani, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/016,011

(22) Filed: Jan. 10, 2025

(51) Int. Cl.
*B01J 20/08* (2006.01)
*B01J 20/04* (2006.01)
*B01J 20/28* (2006.01)
*B01J 20/30* (2006.01)
*C02F 1/28* (2023.01)
*C02F 101/30* (2006.01)

(52) U.S. Cl.
CPC ............ *B01J 20/08* (2013.01); *B01J 20/041* (2013.01); *B01J 20/28007* (2013.01); *B01J 20/28016* (2013.01); *B01J 20/28061* (2013.01); *B01J 20/28083* (2013.01); *B01J 20/28095* (2013.01); *B01J 20/3078* (2013.01); *C02F 1/288* (2013.01); *C02F 1/281* (2013.01); *C02F 2101/308* (2013.01)

(58) Field of Classification Search
None
See application file for complete search history.

(56) References Cited

FOREIGN PATENT DOCUMENTS

| CN | 105289617 A | 2/2018 |
|---|---|---|
| CN | 107970907 A | 5/2018 |
| CN | 112707802 | * 4/2021 |

OTHER PUBLICATIONS

Ekla S. Al-Farraj, et al., "Efficient photocatalytic degradation of congo red dye using facilely synthesized and characterized MgAl2O4 nanoparticles", ACS Omega, vol. 09, Issue 04, Jan. 19, 2024 (11 pages).

Shiva Salem, et al., "Photo activity of magnesium aluminate under solar irradiation for treatment of wastewater contaminated by methylene blue: Effect of self-combustion factors on spinel characteristics" Solar Energy Materials and Solar Cells, vol. 218, Dec. 2020 (14 pages).

(Continued)

*Primary Examiner* — Kara M Peo
(74) *Attorney, Agent, or Firm* — Oblon, McClelland, Maier & Neustadt, L.L.P.

(57) ABSTRACT

A nanocomposite comprising MgAl$_2$O$_4$ includes 1 weight percent (wt. %) to 10 wt. % nickel oxide and 1 wt. % to 10 wt. % cobalt oxide. The nickel oxide and the cobalt oxide are doped in the MgAl$_2$O$_4$. The nanocomposite is in the form of particles with an average particle size ranging from 1 nanometer (nm) to 8 nm and a surface area of 100 square meters per gram (m$^2$/g) to 150 m$^2$/g.

4 Claims, 21 Drawing Sheets

(56) References Cited

OTHER PUBLICATIONS

M. Boroujerdnia, et al., "Synthesis and characterization of NiO/MgAl2O4 nanocrystals with high surface area by modified sol-gel method", Microporous and Mesoporous Materials, Apr. 7, 2016 (29 pages).

Elda S. Al-Farraj, et al.. "Efficient photocatalytic decomposition of acid blue 25 dye using facilely synthesized magnesium aluminate nanoparticles", Water Conservation Science and Engineering, Jan. 12, 2024 (13 pages).

\* cited by examiner

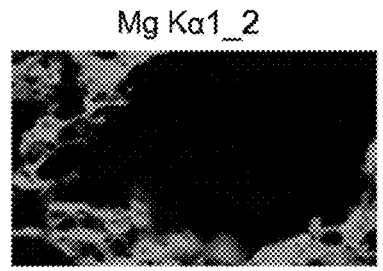 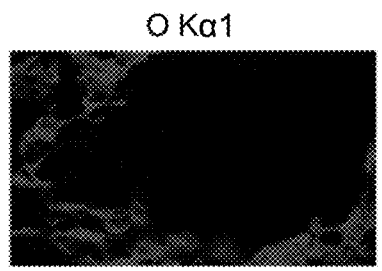 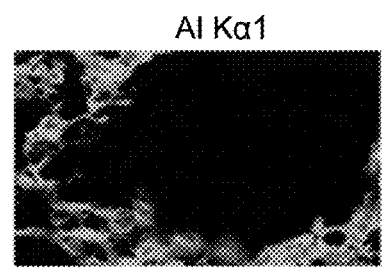
FIG. 4A  FIG. 4B  FIG. 4C
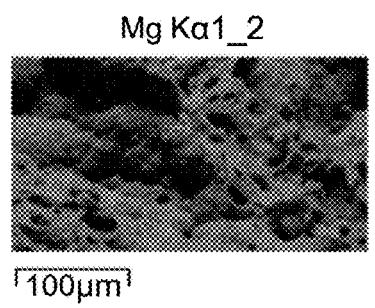 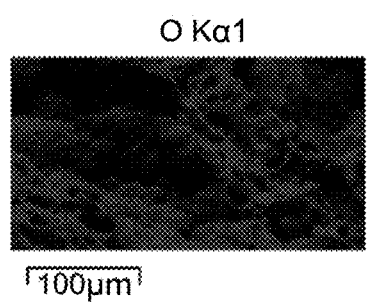 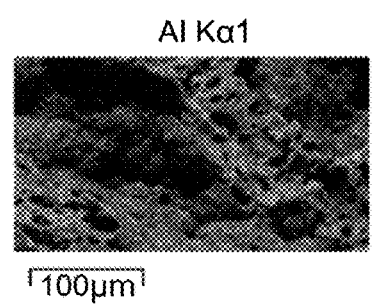
FIG. 4D  FIG. 4E  FIG. 4F
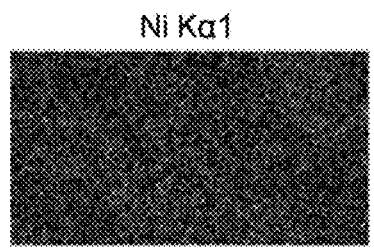 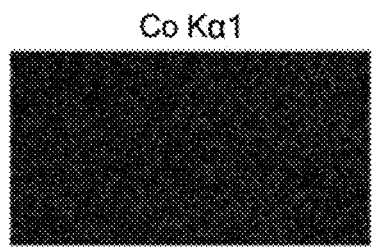
FIG. 4G  FIG. 4H

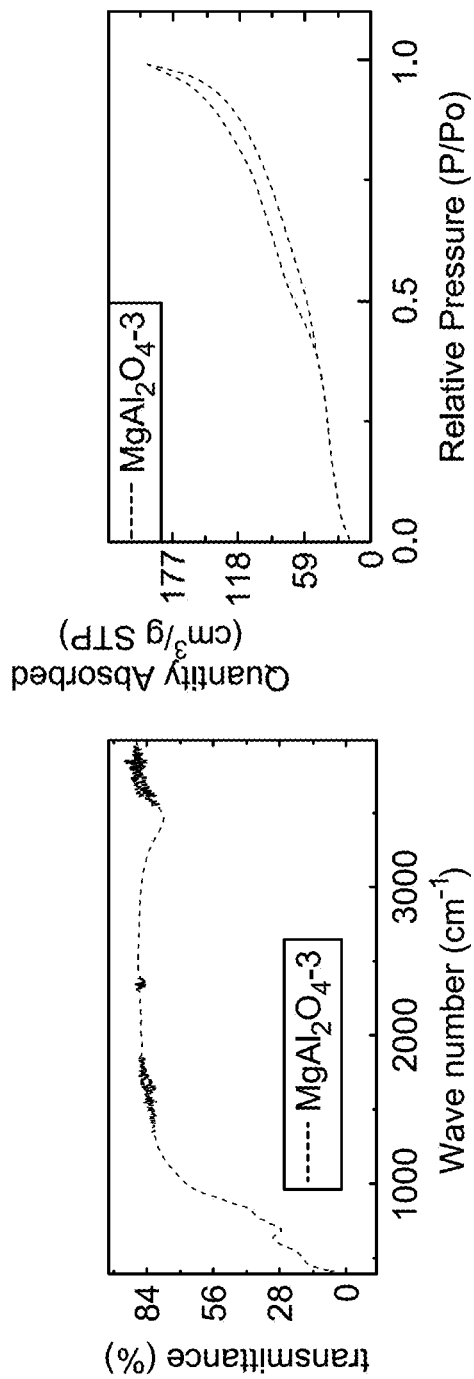
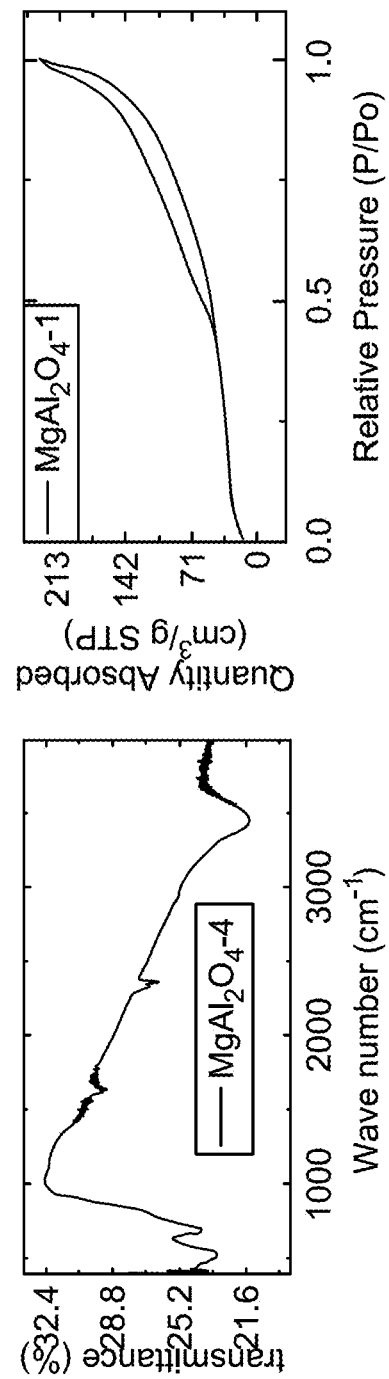
FIG. 5C
FIG. 5D

COBALT OXIDE AND NICKEL OXIDE DOPED MAGNESIUM ALUMINUM OXIDE (CoO—NiO@MgAl$_2$O$_4$) NANOCOMPOSITE FOR DYE REMOVAL FROM WATER

STATEMENT OF ACKNOWLEDGEMENT

Support provided by the Deanship of Scientific Research, Imam Mohammad Ibn Saud Islamic University, Saudi Arabia, through grant number IFP-IMISIU-2023016 is gratefully acknowledged.

BACKGROUND

Technical Field

The present disclosure is directed towards water purification and decontamination and, more particularly, to a cobalt oxide and nickel oxide doped magnesium aluminum oxide (CoO—NiO@MgAl$_2$O$_4$) nanoparticle-based nanocomposite for water purification and decontamination.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Water scarcity is a pressing global issue. Water mitigation is unavoidable for protecting public health and promoting sustainable development. The increasing discharge of toxic dye into water from industrial activities poses risks to human health and the environment, surpassing the capabilities of conventional water treatment systems. The contaminants responsible for polluting water include, but are not limited to, organic pollutants, such as dyes, pharmaceuticals, and surfactants, and inorganic pollutants, such as heavy metal ions and substances. While all water pollutants adversely affect aquatic life and ecosystems, organic dyes (ORD) pose an additional detrimental effect by obstructing visible light when introduced into water sources [Almufarij, R. S. et al., Sweep-out of tigecycline, chlortetracycline, oxytetracycline, and doxycycline from water by carbon nanoparticles derived from tissue waste, Nanomaterials, 2022, 12, 20, 3617]. ORDs have been utilized in various industrial applications, including food, textiles, medicine, cosmetics, plastic, rubber, and paper [Ristea, M-E. and O. Zarnescu, Indigo carmine: between necessity and concern, Journal of Xenobiotics, 2023, 13, 3, 509-528]. Due to persistent and high solubility, organic dyes remain stable under light, heat, and microbial attack, allowing easy transport through aquatic environments. At low concentrations, the intense coloration of synthetic dyes creates aesthetic challenges in wastewater disposal and renders them resistant to conventional treatment methods. The annual production estimate of 70,000 tons, mostly produced by textile industries, establishes organic dyes as a major contributor to water contamination by ORDs. Addressing dye pollution will help produce clean water in sustaining human health, animal life, and overall ecosystem balance.

Textiles treated with various synthetic dyes frequently do not fully absorb the dyes, forming complex, stable chemical compounds that resist natural degradation. Some of the most used dyes in textile, food, and cosmetic industries include reactive dyes, azo dyes, and anthraquinone dyes. Among them, indigo carmine, a synthetic dye, is difficult to remove from wastewater bodies due to its strong color and chemical structure. Indigo carmine is resistant to conventional treatment methods, such as adsorption and biodegradation, indicating long-term environmental pollution and posing challenges for wastewater treatment processes. Indigo carmine (INCR, $C_{16}H_8N_2Na_2O_8S_2$, 466.367 grams per mole (g mol$^{-1}$)), with double sodium sulfonate groups, induce high INCR solubility in water [Chowdhury, M. F. et al., Current treatment technologies and mechanisms for removal of indigo-carmine dyes from wastewater: A review, Journal of Molecular Liquids, 2020, 318, 114061]. Due to its resistance to high temperatures, oxidizing chemicals, and harsh light, INCR exhibits low biodegradability and may bioaccumulate in the environment, potentially disrupting food chains and causing ecological imbalances [Babu, A. N. and et al., Removal of hazardous indigo-carmine dye from waste water using treated red mud, Materials Toady: Proceedings, 2019, 17, 198-282]. INCR causes severe acute hypotension, skin irritation, and eye discoloration. At concentrations as low as 170 micromolar (μM), INCR decreases reproduction rates and elevates mortality rates of marine organisms.

Traditional methods for treating dye-polluted water include physical, chemical, and biological approaches. Physical methods, such as adsorption and filtration, are often simple and cost-effective but are limited by the inability to fully remove dyes, especially at low concentrations. Chemical methods, including coagulation, oxidation, and advanced oxidation processes, may break down dyes but often require high energy inputs, generate toxic byproducts, and involve expensive reagents. Biological methods, such as microbial degradation, offer an eco-friendly alternative but are generally slow and less effective against dyes with complex molecular structures and high stability. Despite widespread use of traditional methods, the persistence and non-biodegradability of synthetic dyes remain. The aforementioned methods exhibit drawbacks, including handling difficulties, high economic cost aspects, generation of toxic radicals, and technical limitations; therefore, there arises a need for economical and effective techniques, such as adsorption protocols that do not generate secondary contamination, to eliminate ORD from contaminated water sources.

Developing more efficient and cost-effective materials derived from nanoparticles rather than commercial materials has been a focus in recent years. Metal oxide doping to improve characteristics of base materials by altering the doping substance and/or percentage of the doping substance is used to improve wastewater treatments; however, challenges remain in addressing dye pollution, and more work is needed to refine conventional technologies for more effective and sustainable solutions to growing environmental issues. Accordingly, an object of the present disclosure is to provide a nanocomposite and a method of dye removal that may circumvent the drawbacks and limitations, such as high cost, low efficiency, low adsorption capabilities, and low biodegradability, of methods and materials known in the art.

SUMMARY

In an exemplary embodiment, a nanocomposite is described. The nanocomposite includes MgAl$_2$O$_4$, 1 weight percent (wt. %) to 10 wt. % nickel oxide and 1 wt. % to 10 wt. % cobalt oxide. The nickel oxide (NiO) and the cobalt oxide (CoO) are doped in the MgAl$_2$O$_4$. The nanocomposite is in the form of particles having an average particle size of 1 nanometer (nm) to 8 nm. The nanocomposite has a surface area of 100 meters per gram (m²/g) to 150 m²/g.

In some embodiments, the nanocomposite is porous and has an average pore size of 65 angstrom (Å) to 90 Å, and the nanocomposite does not contain carbon (C).

In some embodiments, the nanocomposite is made by a process which includes mixing gelatin, an aluminum (Al) salt, a magnesium (Mg) salt, a nickel (Ni) salt, and a cobalt (Co) salt, in water to form a solution. The process includes heating the solution to form a solid, and calcinating the solid at a temperature of 500° C. to 600° C. for 3 hours to 5 hours to form the nanocomposite.

In another exemplary embodiment, a method of dye removal from water is described. The method includes contacting the nanocomposite with an aqueous solution. The aqueous solution includes one or more dyes. The method includes adsorbing the one or more dyes on the nanocomposite to form a product solution. The product solution has a lesser amount of the one or more dyes than the aqueous solution.

In some embodiments, the nanocomposite has a dye removal percentage of at least 90%.

In some embodiments, the one or more dyes include indigo carmine.

In some embodiments, the aqueous solution has an initial concentration of the one or more dyes of 10 milligram per liter (mg/L) to 150 mg/L.

In some embodiments, the contacting occurs at a pH of 3 to 10.

In some embodiments, the contacting occurs at a temperature 10° C. to 60° C.

In some embodiments, the aqueous solution further includes one or more salts.

In some embodiments, the nanocomposite includes 5 wt. % nickel oxide and 5 wt. % cobalt oxide, and the nanocomposite has an average particle size of 7 nm to 8 nm.

In some embodiments, the nanocomposite includes 5 wt. % nickel oxide and 2.5 wt. % cobalt oxide, and the nanocomposite has an average particle size of 2 nm to 3.5 nm, and the nanocomposite is mainly amorphous.

In some embodiments, the nanocomposite includes 2.5 wt. % nickel oxide and 5 wt. % cobalt oxide, and the nanocomposite has an average particle size of 6 nm to 7 nm.

In some embodiments, the nanocomposite includes 5 wt. % nickel oxide and 5 wt. % cobalt oxide, and the nanocomposite has a surface area of 110 m²/g to 125 m²/g.

In some embodiments, the nanocomposite includes 5 wt. % nickel oxide and 2.5 wt. % cobalt oxide, and the nanocomposite has a surface area of 135 m²/g to 145 m²/g.

In some embodiments, the nanocomposite includes 2.5 wt. % nickel oxide and 5 wt. % cobalt oxide, and the nanocomposite has a surface area of 115 m²/g to 130 m²/g.

In some embodiments, the nanocomposite includes 5 wt. % nickel oxide and 5 wt. % cobalt oxide, and the nanocomposite is porous and has an average pore size of 80 Å to 88 Å.

In some embodiments, the nanocomposite includes 5 wt. % nickel oxide and 2.5 wt. % cobalt oxide, and the nanocomposite is porous and has an average pore size of 65 Å to 75 Å.

In some embodiments, the nanocomposite includes 2.5 wt. % nickel oxide and 5 wt. % cobalt oxide, and the nanocomposite is porous and has an average pore size of 75 Å to 85 Å.

In some embodiments, the nanocomposite has a hexagonal shape with the longest dimension of 50 nm to 500 nm.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 4A depicts EDX elemental mapping of $MgAl_2O_4$-1, depicting a presence of magnesium (Mg), with a scale of 100 micrometers (μm), according to certain embodiments.

FIG. 4B depicts EDX elemental mapping analysis of $MgAl_2O_4$-1, depicting a presence of oxygen (O), with a scale of 100 μm, according to certain embodiments.

FIG. 4C depicts EDX elemental mapping analysis of $MgAl_2O_4$-1, depicting a presence of aluminium (Al), with a scale of 100 μm, according to certain embodiments.

FIG. 4D depicts EDX elemental mapping analysis of $MgAl_2O_4$-2, depicting a presence of Mg, with a scale of 100 μm, according to certain embodiments.

FIG. 4E depicts EDX elemental mapping analysis of $MgAl_2O_4$-2, depicting a presence of O, with a scale of 100 μm, according to certain embodiments.

FIG. 4F depicts EDX elemental mapping analysis of $MgAl_2O_4$-2, depicting a presence of Al, with a scale of 100 μm, according to certain embodiments.

FIG. 4G depicts EDX elemental mapping analysis of $MgAl_2O_4$-2, depicting a presence of nickel (Ni), according to certain embodiments.

FIG. 4H depicts EDX elemental mapping analysis of $MgAl_2O_4$-2, depicting a presence of cobalt (Co), according to certain embodiments.

FIG. 5C depicts an FTIR spectrum and an $N_2$ adsorption desorption isotherm for $MgAl_2O_4$-3, according to certain embodiments.

FIG. 5D depicts an FTIR spectrum and an $N_2$ adsorption desorption isotherm for $MgAl_2O_4$-4, according to certain embodiments.

DETAILED DESCRIPTION

Figure 1:
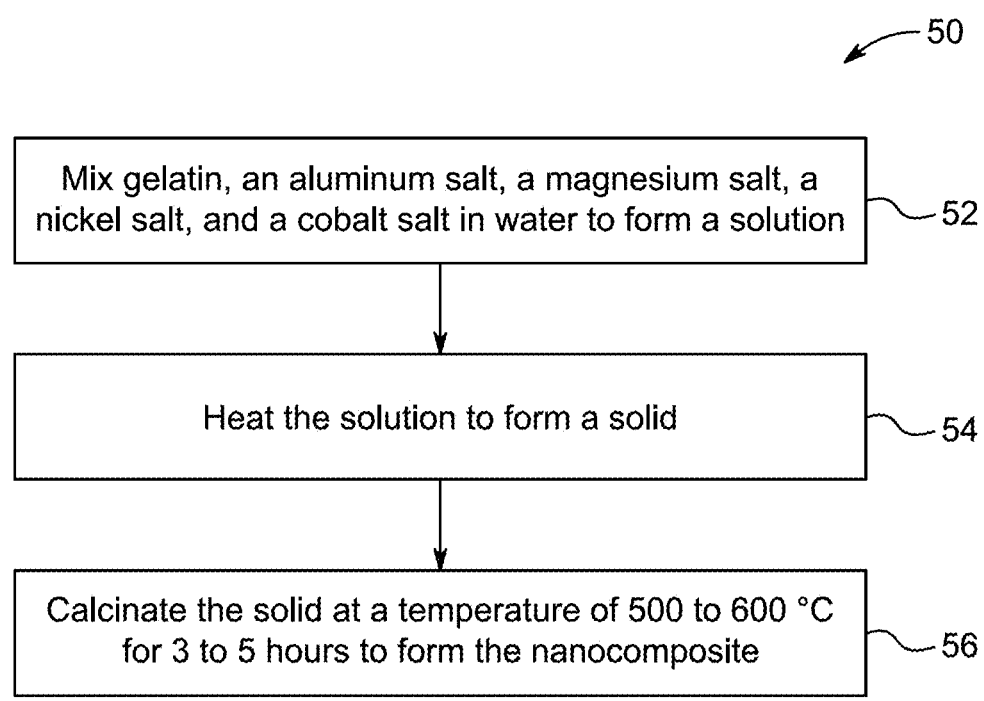
FIG. 1 is a schematic flow chart depicting a method of forming a nanocomposite, according to certain embodiments.
Figure 2B:
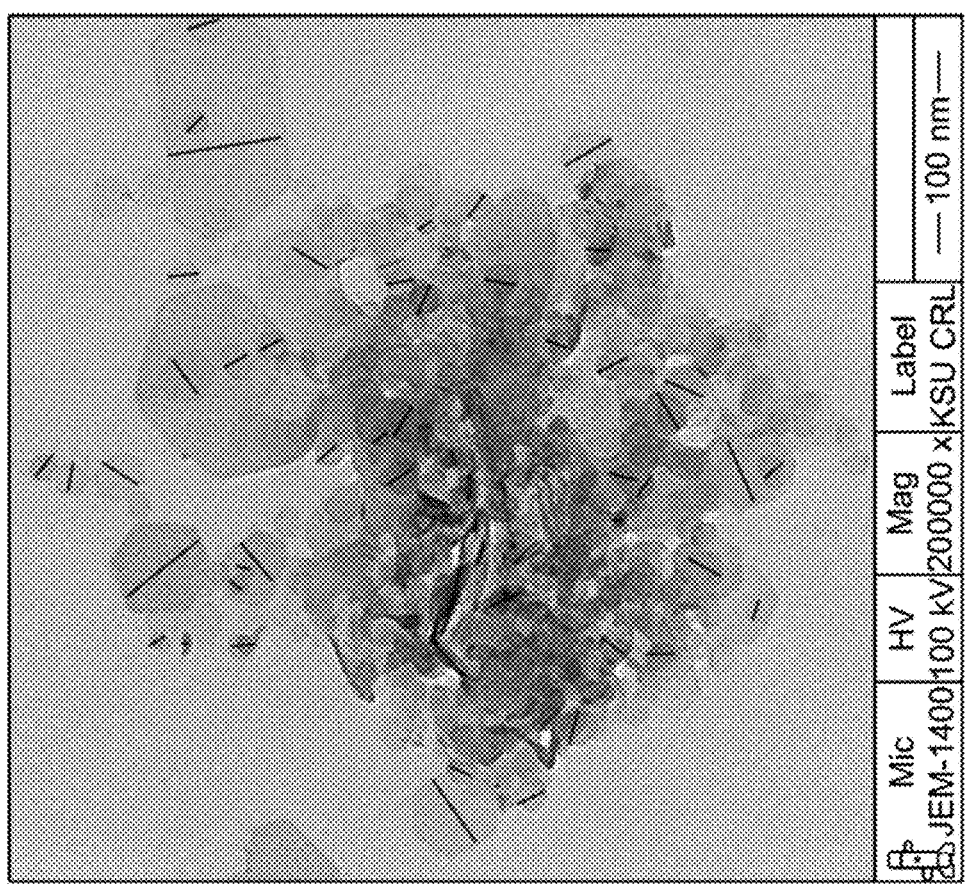
FIG. 2B depicts a TEM image of 5 wt. % NiO and 5 wt. % CoO@$MgAl_2O_4$ (also referred to as $MgAl_2O_4$-2), according to certain embodiments.
Figure 2A:
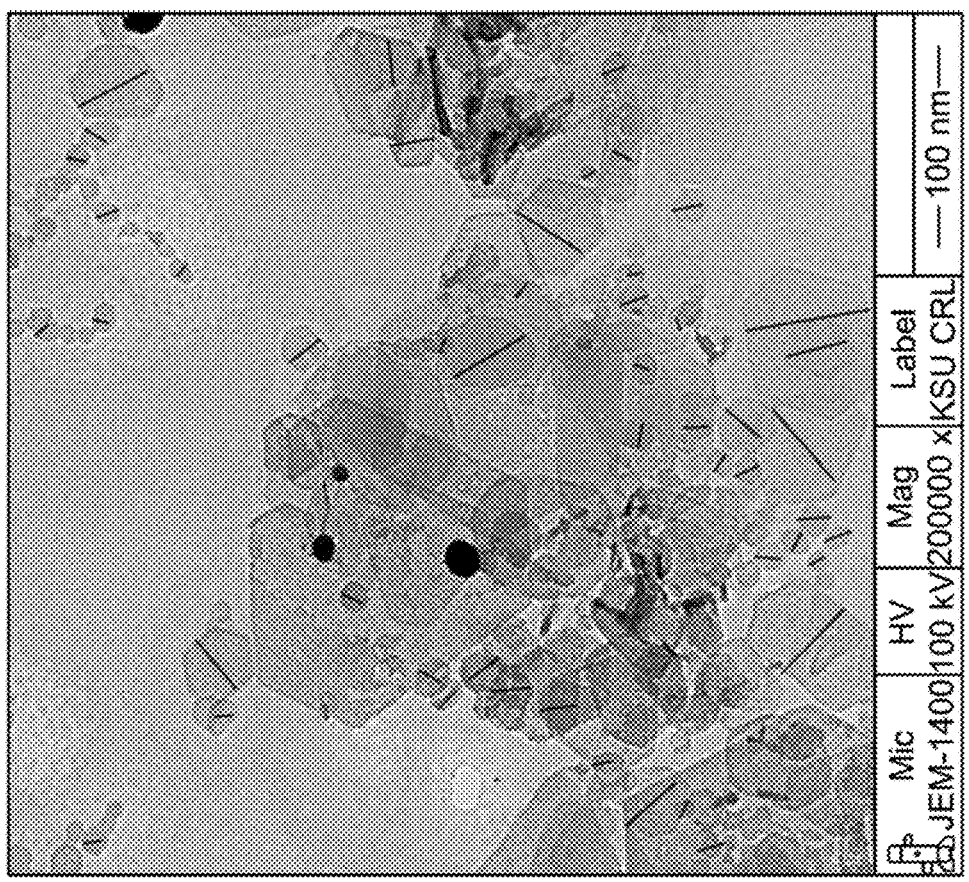
FIG. 2A depicts a transmission electron microscopy (TEM) image of $MgAl_2O_4$ (also referred to as $MgAl_2O_4$-1), according to certain embodiments.
Figure 2D:
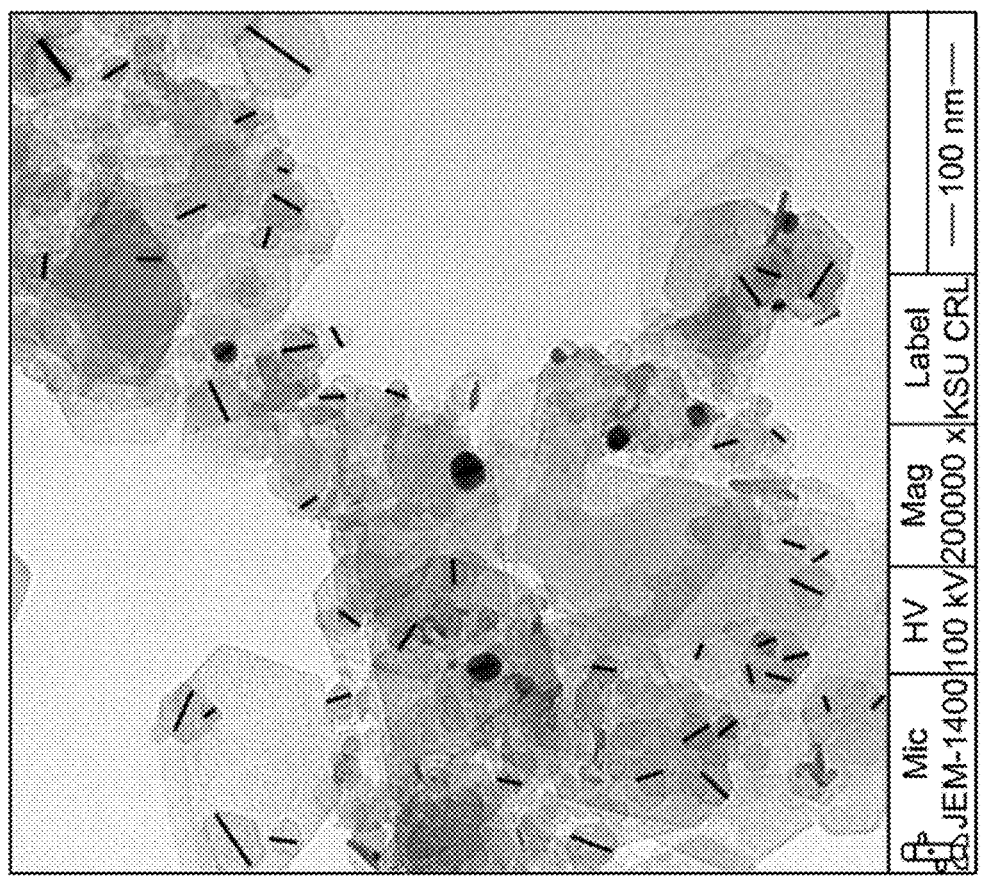
FIG. 2D depicts a TEM image of 2.5 wt. % NiO and 5 wt. % CoO@$MgAl_2O_4$ (also referred to $MgAl_2O_4$-4), according to certain embodiments.
Figure 2C:
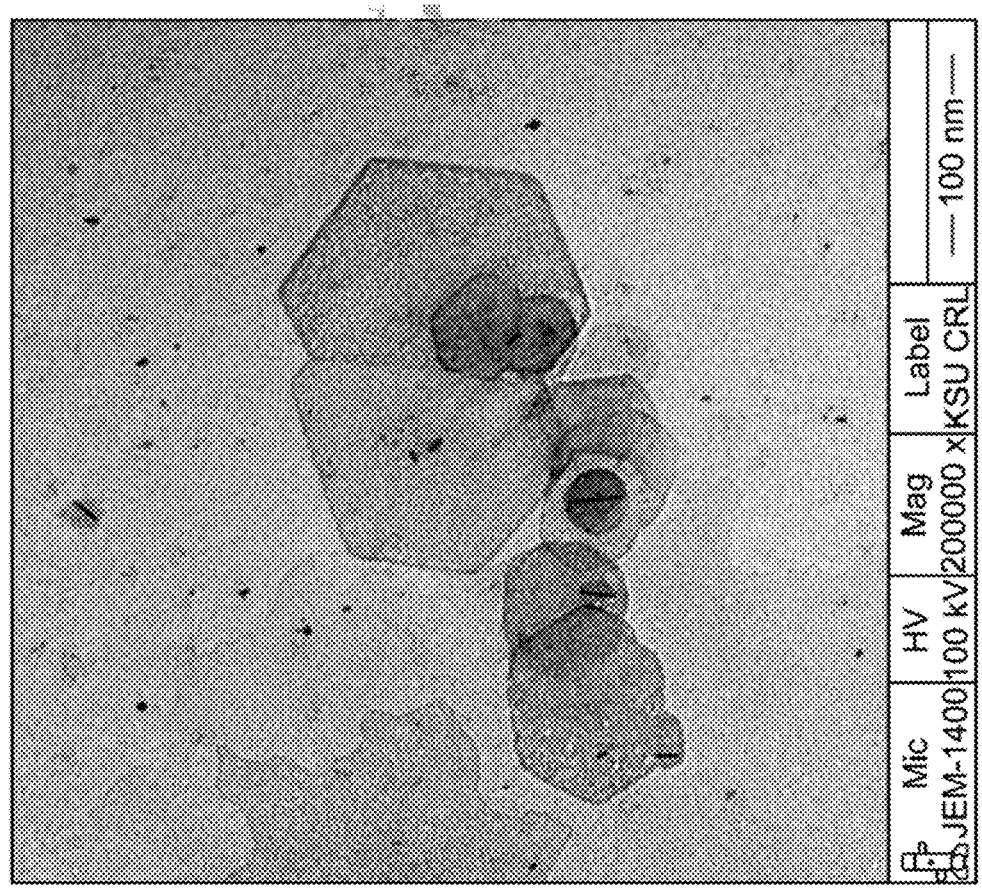
FIG. 2C depicts a TEM image of 5 wt. % NiO and 2.5 wt. % CoO@$MgAl_2O_4$ (also referred to as $MgAl_2O_4$-3), according to certain embodiments.
Figure 3A:
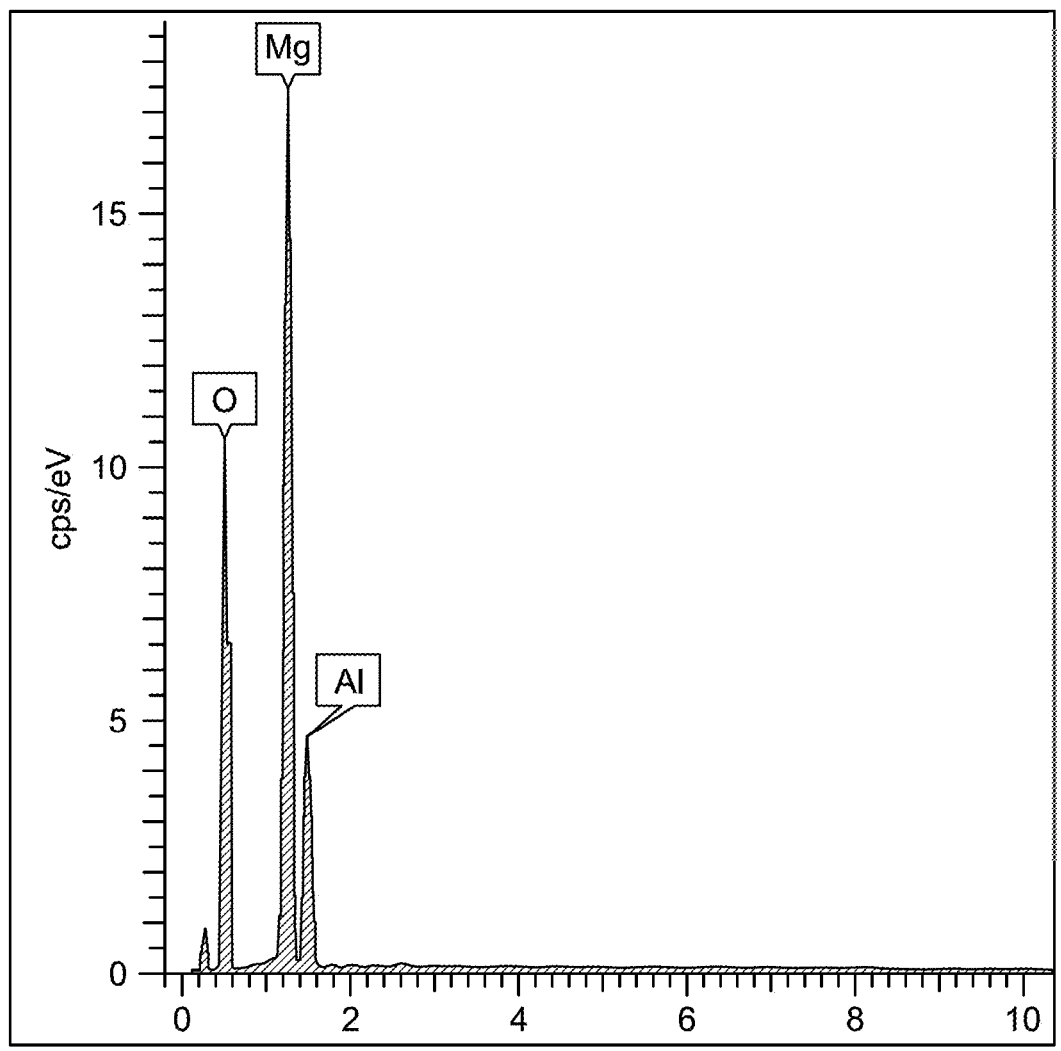
FIG. 3A depicts and energy dispersive X-ray spectroscopy (EDX) analysis for $MgAl_2O_4$-1, according to certain embodiments.
Figure 3B:
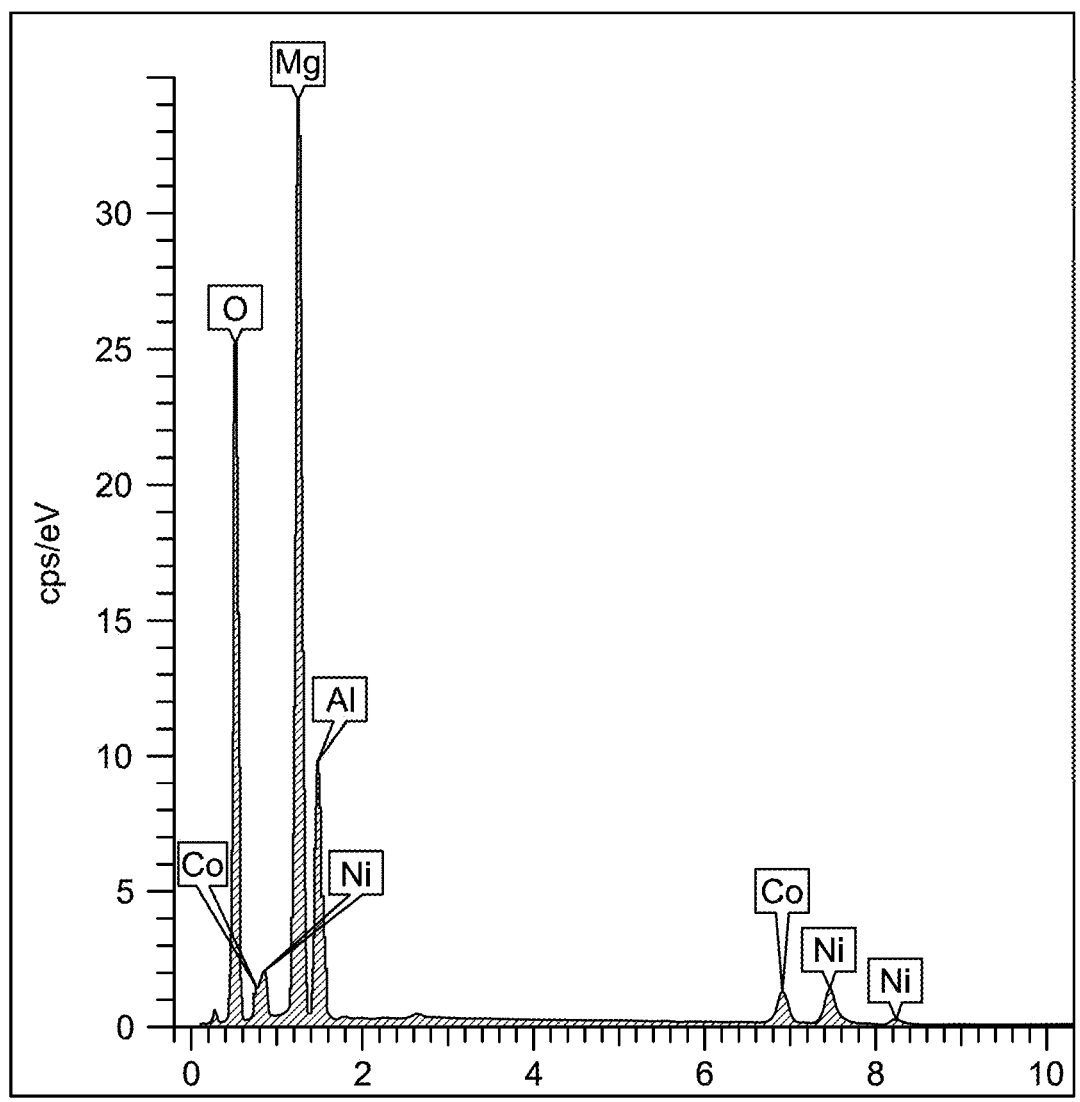
FIG. 3B depicts an EDX analysis for $MgAl_2O_4$-2, according to certain embodiments.
Figure 3C:
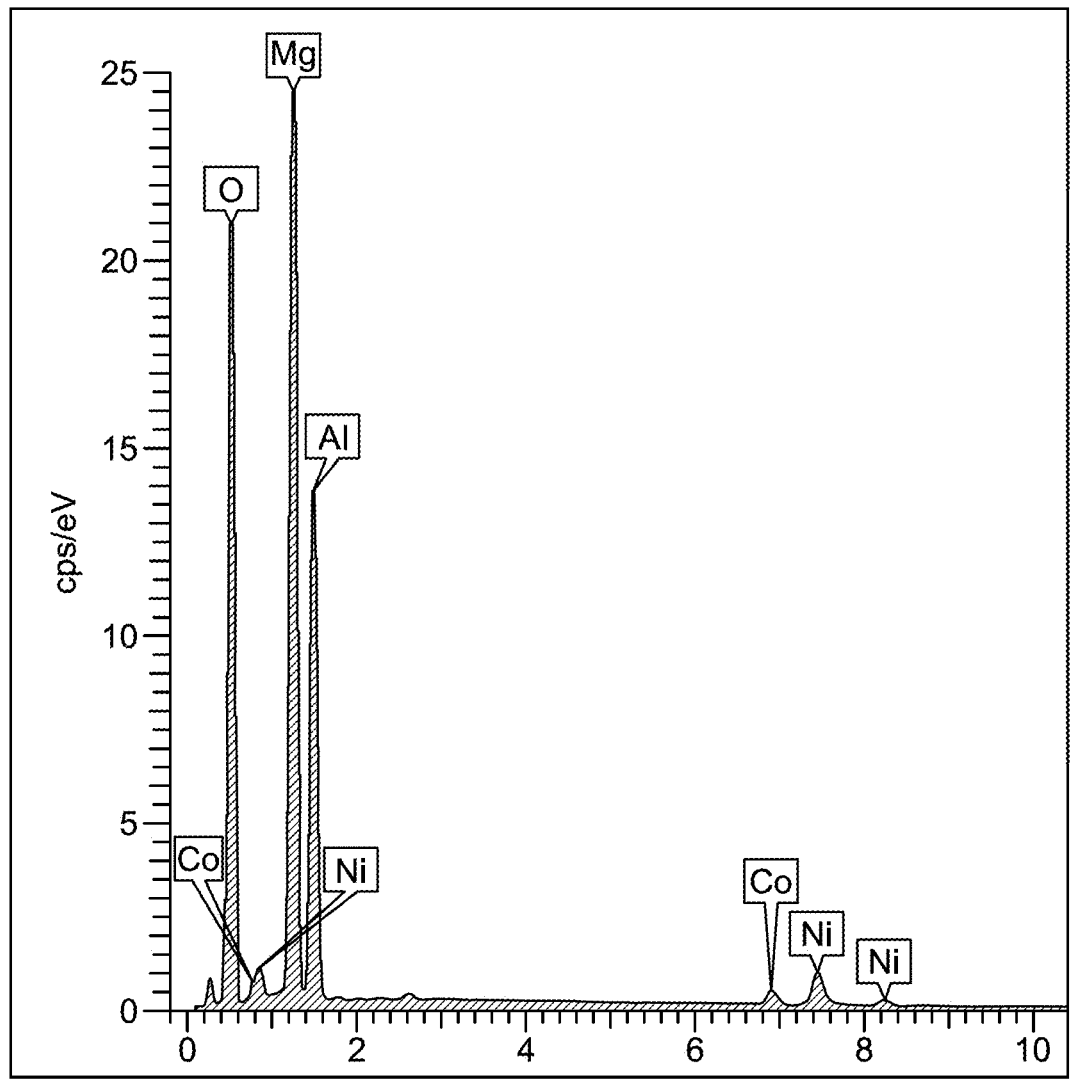
FIG. 3C depicts an EDX analysis for $MgAl_2O_4$-3, according to certain embodiments.
Figure 3D:
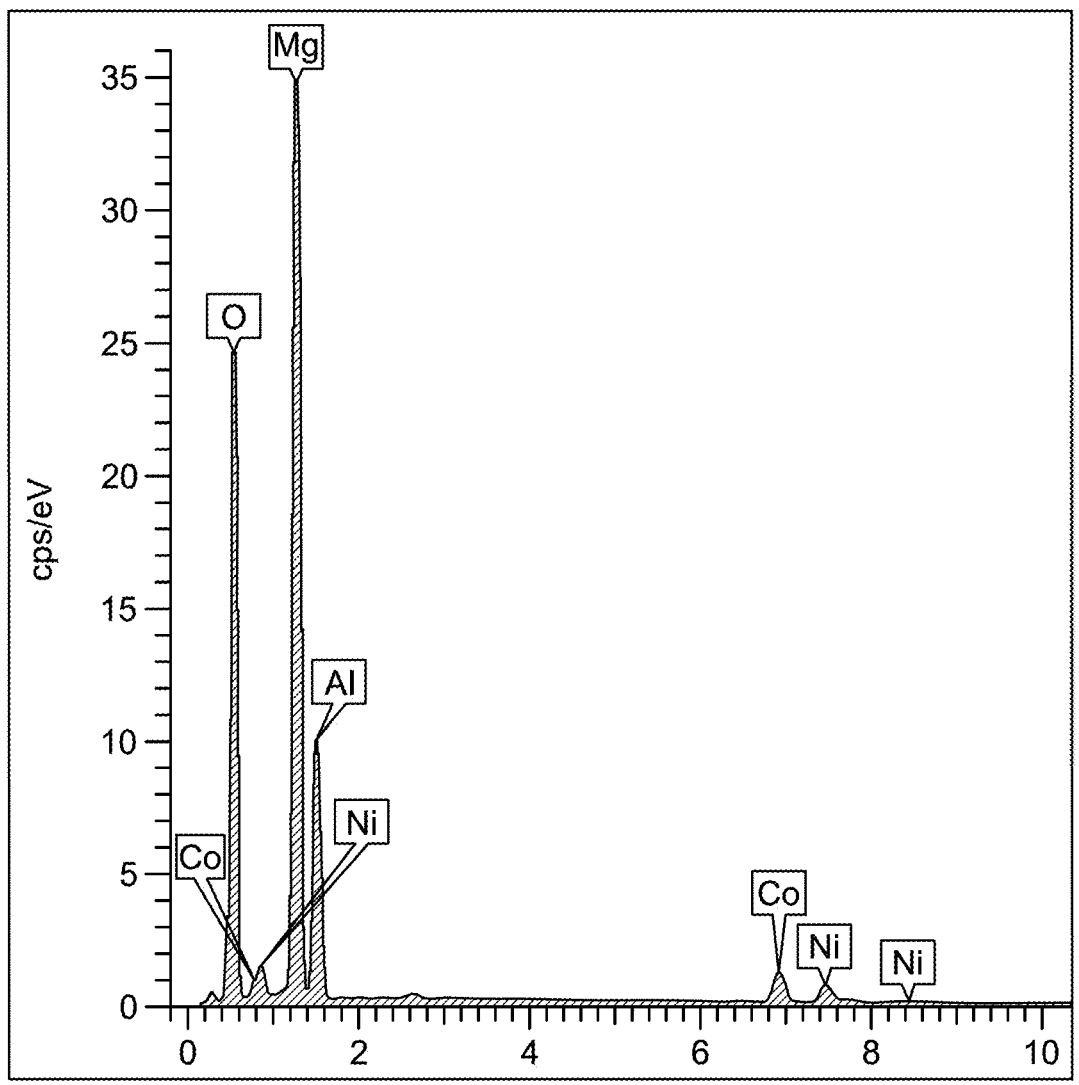
FIG. 3D depicts an EDX analysis for $MgAl_2O_4$-4, according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all embodiments of the disclosure are shown.

In the drawings, like reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the words "about," "approximately," or "substantially similar" may be used when describing magnitude and or position to indicate that the value and/or position described is within a reasonable expected range of values and/or positions. For example, a numeric value may have a value that is +/−0.1% of the stated value (or range of values), +/−1% of the slated value (or range of values), +/−2% of the stated value (or range of values), +/−5% of the slated value (or range of values), +/−10% of the staled value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, the term "average particle size" refers to the mean size of particles in a sample, typically determined by measuring a distribution of particle sizes and calculating the average value, often through techniques such as dynamic light scattering (DLS) and/or scanning electron microscopy (SEM).

As used herein, the term "pore size" refers to the average diameter or width of pores within a material, typically determined by methods such as nitrogen adsorption-desorption, mercury intrusion porosimetry, and/or scanning electron microscopy (SEM). Pore size is a parameter for characterizing porosity and surface area of materials, particularly in nanocomposites and/or catalysts.

A "slit-shaped" pore is a pore that deviates from a cylindrical pore. A slit-shaped pore has a narrow and elongated structure that has a smaller width compared to its length, e.g., a length that is at least 1.5 times the pore width, preferably at least 2 times the pore width, preferably at least 3 times the pore width, preferably at least 5 times the pore width, preferably at least 10 times the pore width, or preferably at least 20 times the pore width. A slit-shaped pore includes crack-like and/or gap-like features on a surface and/or between two flat surfaces.

As used herein, the term "surface area" refers to the total area of an exposed surface of a material per unit of mass or volume. It is typically measured in square meters per gram ($m^2/g$) and is a parameter for characterizing adsorption capacity, reactivity, and porosity of a material, such as a nanocomposite. Surface area provides insights into how well a material can interact with other substances, such as molecules of a dye and/or other pollutants in a solution.

As used herein, the term "nanocomposite" refers to a material composed of two or more distinct components, at least one of which has a nanoscale structure, typically in the range of 1 to 100 nm. These components are combined to form a composite material that may exhibit enhanced properties, such as increased strength, electrical conductivity, chemical reactivity, and/or thermal stability, compared to the individual components. Nanocomposites may be used in various applications, including catalysis, environmental remediation, electronics, and materials science, due to their characteristics at the nanoscale.

As used herein, the term "dye removal from water" refers to a process of eliminating or reducing the concentration of dye molecules or pigments from aqueous solutions. This may be achieved through various methods such as adsorption, chemical degradation, and/or filtration, using materials and/or nanocomposites that can interact with and remove dye contaminants, thus improving water quality and making water suitable for reuse or discharge in an environmentally safe manner.

A weight percent of a component, unless specifically stated to the contrary, is based on a total weight of the formulation and/or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

Aspects of the present disclosure are directed to a nanocomposite and a method of dye removal from water using the nanocomposite. Dye removal from water is used for preventing environmental pollution and protecting aquatic life.

According to a first aspect of the present disclosure, a nanocomposite is described. The nanocomposite includes $MgAl_2O_4$, 1 to 10 weight percent (wt. %) nickel oxide, and 1 to 10 wt. % cobalt oxide. The nickel oxide and the cobalt oxide are doped in the $MgAl_2O_4$. The nanocomposite is in the form of particles having an average particle size of 1 to 8 nm. The nanocomposite has a surface area of 100 to 150 $m^2/g$.

In some embodiments, the nanocomposite may include 1 to 10 weight percent (wt. %), preferably 1.5 to 8 wt. %, more preferably 2 to 6 wt. %, and yet more preferably about 2.5 to 5 wt. % nickel oxide and 1 to 10 wt. %, preferably 1.5 to 8 wt. %, more preferably 2 to 6 wt. %, and yet more preferably about 2.5 to 5 wt. % cobalt oxide. In an embodiment, the nanocomposite contains 5 wt. % nickel oxide and 5 wt. % cobalt oxide. In another embodiment, the nanocomposite contains 5 wt. % nickel oxide and 2.5 wt. % cobalt oxide. In a preferred embodiment, the nanocomposite contains 2.5 wt. % nickel oxide and 5 wt. % cobalt oxide.

In some embodiments, the nanocomposite has an average particle size of 1 to 8 nm, preferably 1.5 to 7.5 nm, preferably 2 to 7 nm, preferably 2.5 to 6.5 nm, preferably 3 to 6 nm, preferably 3.5 to 5.5 nm, and preferably 4 to 5 nm.

In some embodiments, the nanocomposite includes 5 wt. % nickel oxide and 5 wt. % cobalt oxide and has an average particle size of 7 to 8 nm, preferably 7.2 to 7.9 nm, preferably 7.4 to 7.8 nm, more preferably 7.5 to 7.7 nm, and yet more preferably about 7.6 nm. In a preferred embodiment, the nanocomposite includes 5 wt. % nickel oxide and 5 wt. % cobalt oxide and has an average particle size of 7.6 nm.

In some embodiments, the nanocomposite includes 5 wt. % nickel oxide and 2.5 wt. % cobalt oxide and has an average particle size of 2 to 3.5 nm, preferably 2.1 to 3.4 nm, preferably 2.2 to 3.3 nm, preferably 2.3 to 3.2 nm, preferably 2.4 to 3.1 nm, preferably 2.6 to 3 nm, more preferably 2.7 to 2.9 nm, and yet more preferably about 2.8 nm. In a preferred embodiment, the nanocomposite includes 5 wt. % nickel oxide and 2.5 wt. % cobalt oxide and has an average particle size of 2.8 nm.

In some embodiments, the nanocomposite includes 2.5 wt. % nickel oxide and 5 wt. % cobalt oxide and has an average particle size of 6 to 7 nm, preferably 6.1 to 6.9 nm, preferably 6.2 to 6.8 nm, preferably 6.3 to 6.7 nm, more preferably 6.4 to 6.6 nm, and yet more preferably about 6.5 nm. In a preferred embodiment, the nanocomposite includes 2.5 wt. % nickel oxide and 5 wt. % cobalt oxide and has an average particle size of 6.5 nm.

In some embodiments, the nanocomposite has a surface area of 100 to 150 $m^2/g$, preferably 105 to 145 $m^2/g$, preferably 110 to 140 $m^2/g$, preferably 115 to 135 $m^2/g$, and preferably 120 to 130 $m^2/g$.

In some embodiments, the nanocomposite includes 5 wt. % nickel oxide and 5 wt. % cobalt oxide and has a surface area of 110 to 125 $m^2/g$, preferably 112 to 124 $m^2/g$, preferably 114 to 122 $m^2/g$, preferably 116 to 120 $m^2/g$, more preferably 117 to 119 $m^2/g$, and yet more preferably about 118.3 to 118.5 $m^2/g$. In a preferred embodiment, the nanocomposite includes 5 wt. % nickel oxide and 5 wt. % cobalt oxide and has a surface area of 118.465 $m^2/g$.

In some embodiments, the nanocomposite includes 5 wt. % nickel oxide and 2.5 wt. % cobalt oxide and has a surface area of 135 to 145 $m^2/g$, preferably 137 to 144 $m^2/g$, preferably 139 to 143 $m^2/g$, more preferably 140 to 142 $m^2/g$, and yet more preferably about 140.5 to 141.5 $m^2/g$. In a preferred embodiment, the nanocomposite includes 5 wt. % nickel oxide and 2.5 wt. % cobalt oxide and has a surface area of 141.073 $m^2/g$.

In some embodiments, the nanocomposite includes 2.5 wt. % nickel oxide and 5 wt. % cobalt oxide and has a surface area of 115 to 130 $m^2/g$, preferably 116 to 128 $m^2/g$, preferably 118 to 126 $m^2/g$, preferably 120 to 125 $m^2/g$, more preferably 122 to 124 $m^2/g$, and yet more preferably about 123.5 to 124.5 $m^2/g$. In a preferred embodiment, the nanocomposite includes 2.5 wt. % nickel oxide and 5 wt. % cobalt oxide and has a surface area of 122.984 $m^2/g$.

In some embodiments, the nanocomposite is porous and has an average pore size of 65 to 90 Å, including 65 to 67 Å, 67 to 69 Å, 69 to 71 Å, 71 to 73 Å, 73 to 75 Å, 75 to 77 Å, 77 to 79 Å, 79 to 81 Å, 81 to 83 Å, 83 to 85 Å, 85 to 87 Å, 87 to 89 Å, 65 to 70 Å, 70 to 75 Å, 75 to 80 Å, 80 to 85 Å, 85 to 90 Å, 65 to 75 Å, 70 to 80 Å, and 75 to 90 Å.

In some embodiments, the nanocomposite includes 5 wt. % nickel oxide and 5 wt. % cobalt oxide, is porous, and has an average pore size ranging from 80 to 88 Å, preferably 81 to 86 Å, more preferably 82 to 85 Å, and yet more preferably 83 to 84 Å. In a preferred embodiment, the nanocomposite includes 5 wt. % nickel oxide and 5 wt. % cobalt oxide, is porous, and has a pore size of 83.846 Å.

In some embodiments, the nanocomposite includes 5 wt. % nickel oxide and 2.5 wt. % cobalt oxide, is porous, and has an average pore size ranging from 65 to 75 Å, preferably 66 to 74 Å, preferably 67 to 73 Å, preferably 68 to 72 Å, more preferably 69 to 71 Å, and yet more preferably 70 to 70.5 Å. In a preferred embodiment, the nanocomposite includes 5 wt. % nickel oxide and 2.5 wt. % cobalt oxide, is porous, and has a pore size of 70.205 Å.

In some embodiments, the nanocomposite includes 2.5 wt. % nickel oxide and 5 wt. % cobalt oxide, is porous, and has an average pore size ranging from 75 to 85 Å, preferably 76 to 84 Å, preferably 77 to 83 Å, preferably 78 to 82 Å, more preferably 79 to 81 Å, and yet more preferably 79.5 to 80 Å. In a preferred embodiment, the nanocomposite includes 2.5 wt. % nickel oxide and 5 wt. % cobalt oxide, is porous, and has a pore size of 79.587 Å.

In some embodiments, the nanocomposite may exist in various morphological shapes, such as nanowires, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanofloweres, mixtures thereof, and the like. In preferred embodiment, the nanocomposite has a hexagonal shape with a longest dimension of 50 to 500 nm, preferably 100 to 400 nm, and preferably 200 to 300 nm. In some embodiments, the nanocomposite does not contain carbon. In some embodiments, the nanocomposite is amorphous. In some embodiments, the nanocomposite is amorphous and crystalline. In some embodiments, the nanocomposite is more amorphous than crystalline, i.e., the nanocomposite is at least 51% amorphous, preferably at least 55% amorphous, preferably at least 60% amorphous, preferably at least 65% amorphous, preferably at least 70% amorphous, preferably at least 75% amorphous, preferably at least 80% amorphous, preferably at least 85% amorphous, and preferably at least 90% amorphous.

FIG. 1 illustrates a schematic flow chart of a method 50 of forming a nanocomposite. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes mixing gelatin, an aluminum salt, a magnesium salt, a nickel salt, and a cobalt salt in water to form a solution. Gelatin acts as a stabilizing or capping agent, providing a matrix for the nanocomposite precursors. The aluminum, magnesium, nickel, and cobalt salts serve as metal precursors providing metal ions for the nanocomposite.

In some embodiments, the aluminum salt may include, but is not limited to, aluminum nitrate ($Al(NO_3)_3$), aluminum chloride ($AlCl_3$), aluminum sulfate ($Al_2(SO_4)_3$), aluminum phosphate ($AlPO_4$), aluminum fluoride ($AlF_3$), aluminum hydroxide ($Al(OH)_3$), aluminum acetate ($Al(CH_3COO)_3$), aluminum oxide ($Al_2O_3$), aluminum bromide ($AlBr_3$), aluminum iodide ($AlI_3$), aluminum borate ($AlBO_3$), aluminum silicate ($Al_2SiO_5$), sodium aluminate ($NaAlO_2$), potassium aluminate ($KAlO_2$), aluminum formate ($Al(HCOO)_3$), aluminum citrate ($Al(C_6H_6O_7)_3$), aluminum lactate ($Al(C_3H_5O_3)_3$), aluminum stearate ($Al(C_{18}H_{35}O_2)_3$), aluminum tartrate ($Al(C_4H_4O_6)_3$), aluminum oxalate ($Al_2(C_2O_4)_3$), aluminum carbonate ($Al_2(CO_3)_3$), aluminum perchlorate ($Al(ClO_4)_3$), aluminum pyrophosphate ($Al_4(P_2O_7)_3$), aluminum sulfite ($Al_2(SO_3)_3$), aluminum chromate ($Al_2(CrO_4)_3$), aluminum permanganate ($Al(MnO_4)_3$), aluminum zirconate ($Al_2ZrO_5$), aluminum titanate ($Al_2TiO_5$), aluminum molybdate ($Al_2(MoO_4)_3$), aluminum tungstate ($Al_2(WO_4)_3$), aluminum gallate ($AlGa_3$), aluminum nitride (AlN), aluminum hydroxynitrate ($Al(OH)_x(NO_3)_y$), aluminum metaborate ($Al(BO_2)_3$), aluminum hydride ($AlH_3$), aluminum sulfide ($Al_2S_3$), aluminum telluride ($Al_2Te_3$), aluminum arsenate ($AlAsO_4$), aluminum vanadate ($AlVO_4$), and basic aluminum chloride ($Al_2(OH)_5Cl$). In preferred embodiment, the aluminum salt is aluminum nitrate nonahydrate ($Al(NO_3)_3 \cdot 9H_2O$)

In some embodiments, a magnesium salt may include, but is not limited to, magnesium chloride ($MgCl_2$), magnesium sulfate ($MgSO_4$), magnesium nitrate ($Mg(NO_3)_2$), magnesium carbonate ($MgCO_3$), magnesium oxide (MgO), magnesium hydroxide ($Mg(OH)_2$), magnesium fluoride ($MgF_2$), magnesium bromide ($MgBr_2$), magnesium iodide ($MgI_2$), magnesium phosphate ($Mg_3(PO_4)_2$), magnesium citrate ($Mg_3(C_6H_5O_7)_2$), magnesium lactate ($Mg(C_3H_5O_3)_2$), magnesium stearate ($Mg(C_{18}H_{35}O_2)_2$), magnesium tartrate ($MgC_4H_4O_6$), magnesium oxalate ($MgCl_2O_4$), magnesium perchlorate ($Mg(ClO_4)_2$), magnesium chromate ($MgCrO_4$), magnesium dichromate ($MgCr_2O_7$), magnesium silicate ($Mg_2SiO_4$), magnesium borate ($Mg_3(BO_3)_2$), magnesium arsenate ($Mg_3(AsO_4)_2$), magnesium sulfite ($MgSO_3$), magnesium thiosulfate ($MgS_2O_3$), magnesium molybdate ($MgMoO_4$), magnesium tungstate ($MgWO_4$), magnesium vanadate ($Mg_3(VO_4)_2$), magnesium zirconate ($MgZrO_3$), magnesium titanate ($MgTiO_3$), magnesium gallate ($MgGa_2O_4$), magnesium hexafluorosilicate ($MgSiF_6$), magnesium hexafluoroaluminate ($MgAlF_6$), magnesium pyrophosphate ($Mg_2P_2O_7$), magnesium hypophosphite ($Mg(H_2PO_2)_2$), magnesium formate ($Mg(HCOO)_2$), magnesium benzoate ($Mg(C_6H_5COO)_2$), magnesium salicylate ($Mg(C_7H_5O_3)_2$), magnesium hydrogen phosphate ($MgHPO_4$), magnesium bisulfate ($Mg(HSO_4)_2$), and magnesium thiocyanate ($Mg(SCN)_2$). In preferred embodiment, the magnesium salt is magnesium acetate tetrahydrate ($Mg(CH_3COO)_2 \cdot 4H_2O$).

In some embodiments, a nickel salt may include, but is not limited to, nickel chloride ($NiCl_2$), nickel sulfate ($NiSO_4$), nickel carbonate ($NiCO_3$), nickel hydroxide ($Ni(OH)_2$), nickel acetate ($Ni(CH_3COO)_2$), nickel oxide (NiO), nickel fluoride ($NiF_2$), nickel bromide ($NiBr_2$), nickel iodide ($NiI_2$), nickel phosphate ($Ni_3(PO_4)_2$), nickel citrate ($Ni_3(C_6H_5O_7)_2$), nickel lactate ($Ni(C_3H_5O_3)_2$), nickel tartrate ($NiC_4H_4O_6$), nickel oxalate ($NiC_2O_4$), nickel chromate ($NiCrO_4$), nickel dichromate ($NiCr_2O_7$), nickel molybdate ($NiMoO_4$), nickel tungstate ($NiWO_4$), nickel vanadate ($Ni_3(VO_4)_2$), nickel silicate ($Ni_2SiO_4$), nickel arsenate ($Ni_3(AsO_4)_2$), nickel borate ($Ni_3(BO_3)_2$), nickel sulfite ($NiSO_3$), nickel thiosulfate ($NiS_2O_3$), nickel hexafluorosilicate ($NiSiF_6$), nickel cyanide ($Ni(CN)_2$), nickel thiocyanate ($Ni(SCN)_2$), nickel formate ($Ni(HCOO)_2$), nickel benzoate ($Ni(C_6H_5COO)_2$), nickel stearate ($Ni(C_{18}H_{35}O_2)_2$), nickel gallate ($NiGa_2O_4$), nickel pyrophosphate ($Ni_2P_2O_7$), nickel hypophosphite ($Ni(H_2PO_2)_2$), nickel perchlorate ($Ni(ClO_4)_2$), a nickel hydrazine complex ($Ni(N_2H_4)_x$), a nickel hexamine complex ($Ni(NH_3)_6Cl_2$), a nickel thiourea complex ($Ni(CS(NH_2)_2)_x$), nickel zincate ($NiZnO_2$), and nickel aluminate ($NiAl_2O_4$). In preferred embodiment, the nickel salt is nickel nitrate hexahydrate ($Ni(NO_3)_2 \cdot 6H_2O$).

In some embodiments, the cobalt salt may include, but is not limited to, cobalt chloride ($CoCl_2$), cobalt sulfate ($CoSO_4$), cobalt nitrate ($Co(NO_3)_2$), cobalt carbonate ($CoCO_3$), cobalt hydroxide ($Co(OH)_2$), cobalt oxide (CoO), cobalt fluoride (CoF$_2$), cobalt bromide (CoBr$_2$), cobalt iodide (CoI$_2$), cobalt phosphate (Cos(PO$_4$)$_2$), cobalt citrate (CO$_3$(C$_6$H$_5$O$_7$)$_2$), cobalt tartrate (CoC$_4$H$_4$O$_6$), cobalt oxalate (CoC$_2$O$_4$), cobalt chromate (CoCrO$_4$), cobalt dichromate (CoCr$_2$O$_7$), cobalt molybdate (CoMoO$_4$), cobalt tungstate (CoWO$_4$), cobalt vanadate (Co$_3$(VO$_4$)$_2$), cobalt silicate (Co$_2$SiO$_4$), cobalt arsenate (Co$_3$(AsO$_4$)$_2$), cobalt borate (CO$_3$(BO$_3$)$_2$), cobalt sulfite (CoSO$_3$), cobalt thiosulfate (CoS$_2$O$_3$), cobalt perchlorate (Co(ClO$_4$)$_2$), cobalt thiocyanate (Co(SCN)$_2$), cobalt formate (Co(HCOO)$_2$), cobalt benzoate (Co(C$_6$H$_5$COO)$_2$), cobalt stearate (Co(C$_{18}$H$_{35}$O$_2$)$_2$), cobalt cyanide (Co(CN)$_2$), cobalt hexafluorosilicate (CoSiF$_6$), cobalt hypophosphite (Co(H$_2$PO$_2$)$_2$), cobalt pyrophosphate (Co$_2$P$_2$O$_7$), a cobalt hydrazine complex (Co(N$_2$H$_4$)$_x$), a cobalt hexamine complex (Co(NH$_3$)$_6$Cl$_2$), a cobalt thiourea complex (Co(CS(NH$_2$)$_2$)$_x$), cobalt aluminate (CoAl$_2$O$_4$), cobalt gallate (CoGa$_2$O$_4$), cobalt zirconate (CoZrO$_3$), and cobalt titanate (CoTiO$_3$). In preferred embodiment, the cobalt salt is cobalt acetate (Co(CH$_3$COO)$_2$).

At step 54, the method 50 includes heating the solution to form a solid. Heating initiates gelation and/or promotes interactions among the components, resulting in a solid gel or precipitate. In some embodiments, the solution is heated in the range from 50 to 200° C., preferably 55 to 190° C., preferably 60 to 180° C., preferably 65 to 170° C., preferably 70 to 160° C., preferably 75 to 150° C., preferably 80 to 140° C., preferably 85 to 130° C., preferably 90 to 120° C., more preferably 95 to 110° C., and yet more preferably about 100° C. In a preferred embodiment, the solution is heated at 100° C.

At step 56, the method 50 includes calcinating the solid at a temperature of 500 to 600° C. for 3 to 5 hours to form the nanocomposite. In some embodiments, the solid is calcinated at a temperature of 500 to 600° C., preferably 505 to 595° C., preferably 510 to 590° C., preferably 515 to 585° C., preferably 520 to 580° C., preferably 525 to 575° C., preferably 530 to 570° C., preferably 535 to 565° C., preferably 540 to 560° C., more preferably 545 to 555° C., and yet more preferably about 550° C. In a preferred embodiment, the solid is calcinated at a temperature of 550° C. This step removes organic components (e.g., gelatin decomposition) and facilitates crystallization and formation of the nanocomposite structure.

In some embodiments, the solid may be calcinated for a duration of 3 to 5 hours, preferably 3.2 to 4.8 hours, preferably 3.4 to 4.6 hours, preferably 3.6 to 4.4 hours, more preferably 3.8 to 4.2 hours, and yet more preferably about 4 hours. In a preferred embodiment, the solid is calcinated for 4 hours.

A method of dye removal from water using the nanocomposite is also described. The method includes contacting the nanocomposite with an aqueous solution and adsorbing the one or more dyes on the nanocomposite to form a product solution. The product solution has a lesser amount of the one or more dyes than the aqueous solution.

In some embodiment, the aqueous solution comprises one or more dyes. In some embodiments, the aqueous solution further includes one or more salts. In some embodiments, the pollutant is a dye. A dye is a colored substance that chemically binds to a material it may be intended to color. Generally, a dye is applied to the solution, typically an aqueous solution.

Examples of dyes include, but are not limited to, acridine dyes (which include acridine and its derivatives, such as acridine orange, acridine yellow, acriflavine, and gelgreen), anthraquinone dyes (which include anthroaquinone and its derivatives, such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1), diaryl methane dyes (such as auramine O), triarylmethane dyes (such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FlAsH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange), azo dyes (such as acid orange 5, acid red 13, alican yellow, alizarine yellow R, allura red AC, amaranth, amido black lOB, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red 0, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine), azin dyes (such as basic black 2, mauveine, neutral red, Perkin's mauve, phenazine, and safranin), indophenol dyes (such as indophenol and dichlorophenolindophenol), oxazin dyes, oxazone dyes, thiazine dyes (such as azure A, methylene blue, methylene green, new methylene blue, and toluidine blue), thiazole dyes (such as primuline, stains-all, and thioflavin), xanthene dyes (such as 6-carboxyfluorescein, eosin B, eosin Y, erythosine, fluorescein, rhodamine B, rose bengal, and Texas red), fluorone dyes (such as calcein, carboxyfluorescein diacetate succinimidyl ester, fluo-3, fluo-4, indian yellow, merbromin, pacific blue, phloxine, and seminaphtharhodafluor), and/or rhodamine dyes (such as rhodamine, rhodamine 6G, rhodamine 123, rhodamine B, sulforhodamine 101, and sulforhodamine B). In a preferred embodiment, the dye is indigo carmine In some embodiments, the aqueous solution including the indigo carmine may have an initial concentration ranging from 10 to 150 mg/L, including, but not limited to, 10 to 20 mg/L, 15 to 25 mg/L, 20 to 30 mg/L, 25 to 35 mg/L, 30 to 40 mg/L, 35 to 45 mg/L, 40 to 50 mg/L, 45 to 55 mg/L, 50 to 60 mg/L, 55 to 65 mg/L, 60 to 70 mg/L, 65 to 75 mg/L, 70 to 80 mg/L, 75 to 85 mg/L, 80 to 90 mg/L, 85 to 95 mg/L, 90 to 100 mg/L, 95 to 105 mg/L, 100 to 110 mg/L, 110 to 120 mg/L, 120 to 130 mg/L, 130 to 140 mg/L, and 140 to 150 mg/L. In a preferred embodiment, the aqueous solution has an initial concentration of indigo carmine in the range of 20 to 80 mg/L.

In some embodiments, the method of contacting the nanocomposite with the aqueous solution occurs at a pH ranging from 3 to 10, preferably 3.5 to 9.5, preferably 4 to 9, preferably 4.5 to 8.5, preferably 5 to 8, more preferably 5.5 to 7, and yet more preferably at a pH of about 6.

In some embodiment, the method of contacting the nanocomposite with the aqueous solution occurs at a temperature 10 to 60° C., preferably 15 to 55° C., preferably 20 to 50° C., preferably 25 to 45° C., and preferably 30 to 40° C.

In some embodiments, the nanocomposite has a dye removal percentage of at least 90%, preferably at least 91%, preferably at least 92%, preferably at least 93%, more preferably at least 94%, and yet more preferably at least 95%. In a preferred embodiment, the nanocomposite exhibits a dye removal percentage of 96%.

EXAMPLES

The following examples describe and demonstrate a nanocomposite and a method of preparation and dye removal from water thereof. The examples are provided solely for illustration and are not to be construed as limitations of the present disclosure, as many variations thereof are possible without departing from the spirit and scope of the present disclosure.

Example 1: Materials

Sodium hydroxide (NaOH, 37%) and hydrochloric acid (HCl, 37%) were procured from Sharlau, Spain. Indigo carmine (INCR) dye and magnesium acetate $(Mg(Ac)_2 \cdot 4H_2O)$ were procured from Fluka, Switzerland. Aluminum nitrate nonahydrate $(Al(NO_3)_3 \cdot 9H_2O)$, nickel nitrate $(Ni(NO_3)_2 \cdot 6H_2O)$, and gelatine (GLN) were purchased from Redel De-Haene, Germany. Cobalt acetate $(Co(Ac)_2)$ was obtained from Inlab, England.

Example 2: Preparation of Nanocomposites

Around 10.0 grams (g) of GLN, 13.41 g of $Al(NO_3)_3 \cdot 9H_2O$, 9.19 g and $Mg(Ac)_2 \cdot 4H_2O$ were transferred in a 500 millilitres (mL) beaker and dissolved in 15 mL of distilled water (DW). The mixture was heated to 100° C. until the solution became clear. The beaker was then placed on a hotplate and overheated until the GLN carbonized. The resulting mixture was then transferred to an oven and calcined at 120° C. for 3.0 hours (h) to achieve a dry form of the nanocomposite. The $Ni(NO_3)_2 \cdot 6H_2O$ and $Co(Ac)_2$ were then added to achieve variations of quadruple nanocomposites, denoted as $MgAl_2O_4$-1 $(MgAl_2O_4)$, $MgAl_2O_4$-2 (5 wt. % NiO and 5 wt. % $CoO@MgAl_2O_4$), $MgAl_2O_4$-3 (5 wt. % NiO and 2.5 wt. % $CoO@MgAl_2O_4$), and $MgAl_2O_4$-4 (2.5 wt. % NiO and 5 wt. % $CoO@MgAl_2O_4$). Subsequently, the variations of $MgAl_2O_4$-1, $MgAl_2O_4$-2, $MgAl_2O_4$-3, and $MgAl_2O_4$-4 were synthesized through simultaneous calcination at 550° C. for 4.0 h.

Example 3: Characterization of the Nanocomposites

The structural, elemental, and morphological properties of the synthesized nanocomposites were characterized through various techniques. The structures of nanocomposites $MgAl_2O_4$-1, $MgAl_2O_4$-2, $MgAl_2O_4$-3, and $MgAl_2O_4$-4 were analyzed using field emission scanning electron microscopy (FESEM), energy dispersive X-ray spectroscopy (EDX), and transmission electron microscopy (TEM). The porosity and surface properties of $MgAl_2O_4$-1, $MgAl_2O_4$-2, $MgAl_2O_4$-3, and $MgAl_2O_4$-4 were examined utilizing a surface analyser (ASAP-2020, Micromeritics, Miami, USA). The crystallinity of the $MgAl_2O_4$-1, $MgAl_2O_4$-2, $MgAl_2O_4$-3, and $MgAl_2O_4$-4 nanocomposites was examined using an X-ray diffractometer. The average crystal size (D) was determined using the Scherrer's equation, as provided in equation 1. Lattice parameters (a, c) and were determined using equation 2 and equation 3, respectively. Lattice imperfection strain (ε) was determined using equation 4.

$$D = \frac{0.9\lambda}{\beta \cos\theta} \quad (1)$$

$$a = \frac{\lambda}{\sqrt{3}\sin\theta} \quad (2)$$

$$c = \frac{\lambda}{\sin\theta} \quad (3)$$

$$\varepsilon = \frac{\beta}{4\cos\theta} \quad (4)$$

θ, β, and λ represent the Bragg's angle, the peak width at half-maximum, and the source wavelength of X-ray (Cu-Kα=1.5406 Å), respectively. The parameters revealed were used for understanding the structural properties of the nanocomposites.

$N_2$ isotherm curves were obtained by measuring the amount of gas adsorbed on the sample surface as the relative pressure increased. In contrast, the desorption isotherm was recorded by monitoring the gas released from the sample as the relative pressure decreased. The performed measurements provided insights into the surface area (SA), pore size distribution, and porosity (pore volume (PV)) of the nanocomposite materials. The surficial characteristics of $MgAl_2O_4$-1, $MgAl_2O_4$-2, $MgAl_2O_4$-3, and $MgAl_2O_4$-4 quadruple nanocomposites were explored via the $N_2$ adsorption-desorption measurements. The corresponding data of hysteresis loops for $MgAl_2O_4$-1, $MgAl_2O_4$-2, $MgAl_2O_4$-3, and $MgAl_2O_4$-4 quadruple nanocomposites is listed in Table 1. The quadruple nanocomposites exhibited H3 hysteresis loops, indicative of aggregated micro-mesoporous structures with slit-shaped pores. According to the surface area, the $MgAl_2O_4$ and quadruple nanocomposites were arranged ascendingly as follows: $MgAl_2O_4$-1, $MgAl_2O_4$-2, $MgAl_2O_4$-4, and $MgAl_2O_4$-3. Furthermore, the pore size (PS) may be considered a reflection of the particle size, as larger pores typically result from larger particles or agglomerated material. This was consistent with the particle sizes observed in the TEM images, as shown in FIGS. 2A-2D.

TABLE 1

The surface characteristics of $MgAl_2O_4$-1, $MgAl_2O_4$-2, $MgAl_2O_4$-3, and $MgAl_2O_4$-4 quadruple nanocomposites

| Sorbent | SA ($m^2 g^{-1}$) | PS (Å) | PV ($cm^3 g^{-1}$) |
|---|---|---|---|
| $MgAl_2O_4$-1 | 75.409 | 129.804 | 0.309 |
| $MgAl_2O_4$-2 | 118.465 | 83.846 | 0.320 |
| $MgAl_2O_4$-3 | 141.073 | 70.205 | 0.365 |
| $MgAl_2O_4$-4 | 122.984 | 79.587 | 0.335 |

Figure 4I:
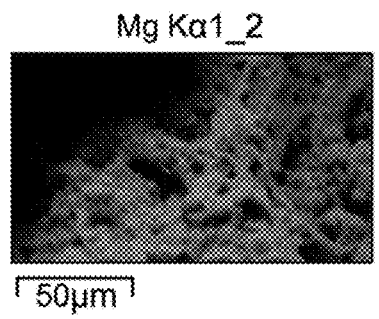
FIG. 4I depicts EDX elemental mapping analysis of $MgAl_2O_4$-3, depicting a presence of Mg, with a scale of 50 μm, according to certain embodiments.
Figure 4J:
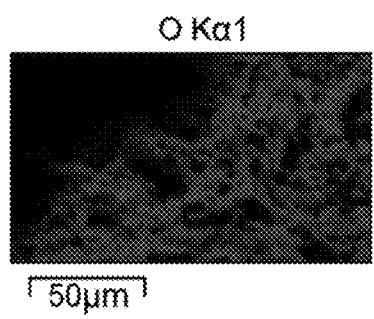
FIG. 4J depicts EDX elemental mapping analysis of $MgAl_2O_4$-3, depicting a presence of O, with a scale of 50 μm, according to certain embodiments.
Figure 4K:
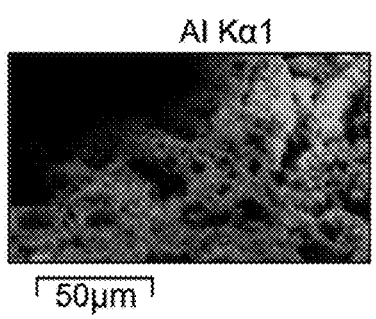
FIG. 4K depicts EDX elemental mapping analysis of $MgAl_2O_4$-3, depicting a presence of Al, with a scale of 50 μm, according to certain embodiments.
Figure 4L:
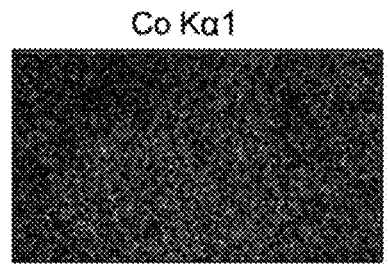
FIG. 4L depicts EDX elemental mapping analysis of $MgAl_2O_4$-3, depicting a presence of Ni, according to certain embodiments.
Figure 4M:
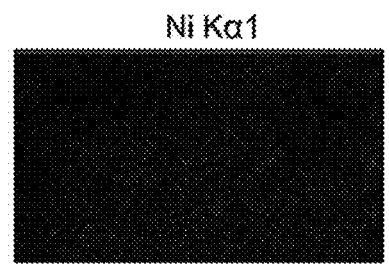
FIG. 4M depicts EDX elemental mapping analysis of $MgAl_2O_4$-3, depicting a presence of Co, according to certain embodiments.
Figure 4N:
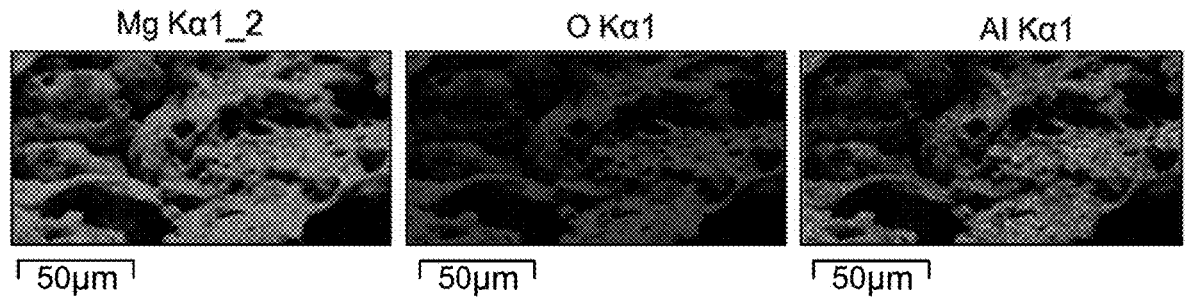
FIG. 4N depicts EDX elemental mapping analysis of $MgAl_2O_4$-4, depicting a presence Mg, with a scale of 50 μm, according to certain embodiments.
Figure 4O:
FIG. 4O depicts EDX elemental mapping analysis of $MgAl_2O_4$-4, depicting a presence of O, with a scale of 50 μm, according to certain embodiments.
Figure 4P:
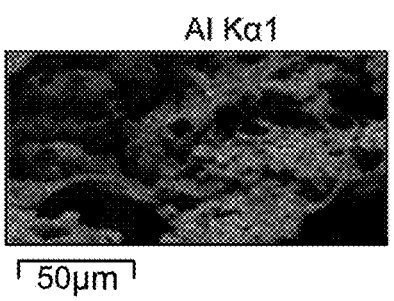
FIG. 4P depicts EDX elemental mapping analysis of $MgAl_2O_4$-4, depicting a presence of Al, with a scale of 50 μm, according to certain embodiments.
Figure 4Q:
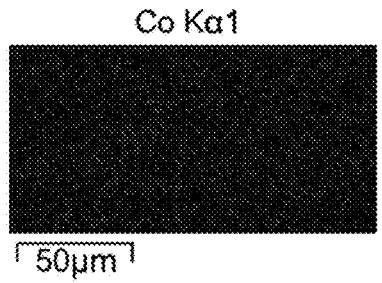
FIG. 4Q depicts EDX elemental mapping analysis of $MgAl_2O_4$-4, depicting a presence of Ni, with a scale of 50 μm, according to certain embodiments.
Figure 4R:
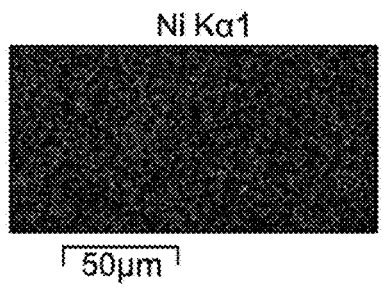
FIG. 4R depicts EDX elemental mapping analysis of $MgAl_2O_4$-4, depicting a presence of Co, with a scale of 50 μm, according to certain embodiments.
Figure 5A:
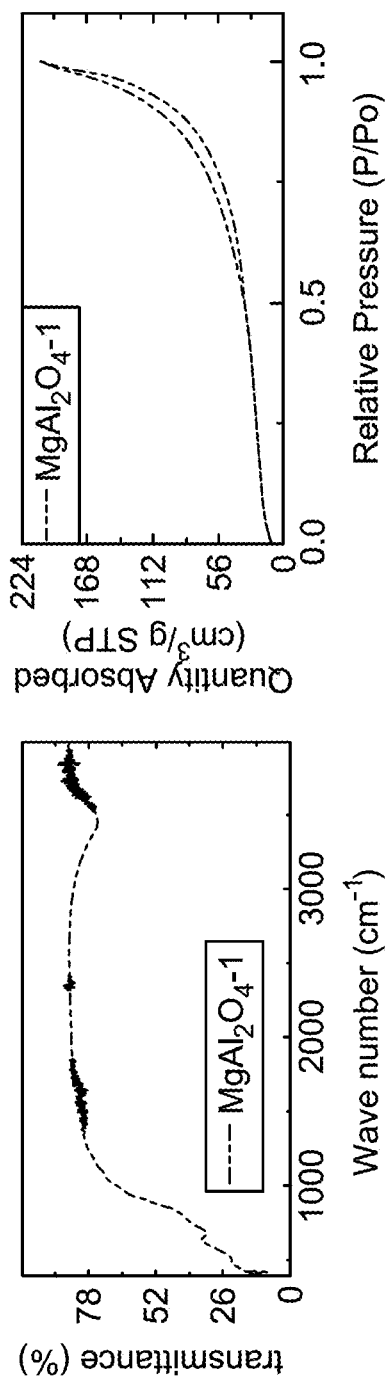
FIG. 5A depicts a Fourier-transform infrared (FTIR) spectrum and a nitrogen ($N_2$) adsorption desorption isotherm for $MgAl_2O_4$-1, according to certain embodiments.
Figure 5B:
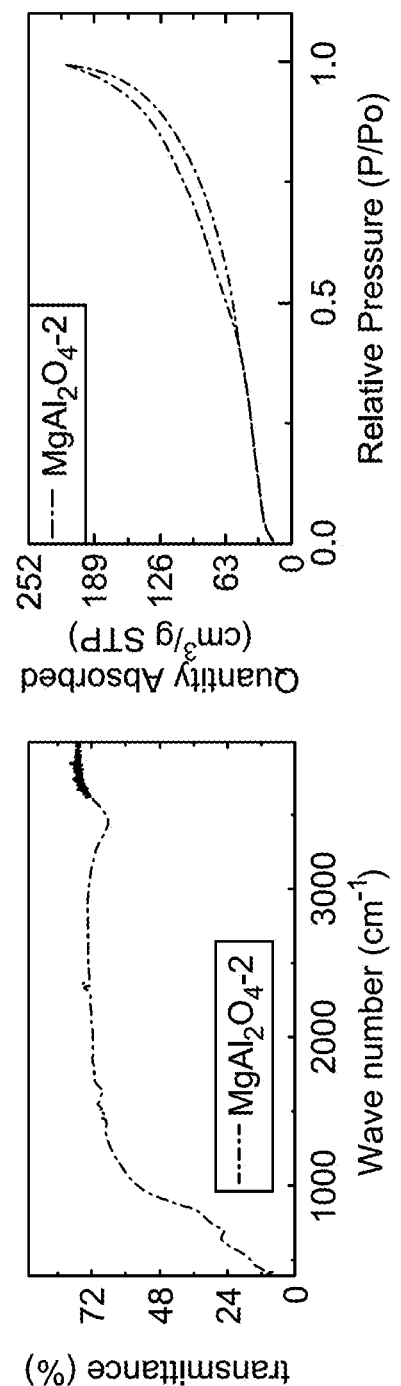
FIG. 5B depicts an FTIR spectrum and an $N_2$ adsorption desorption isotherm for $MgAl_2O_4$-2, according to certain embodiments.

EDX analysis was performed to examine the elemental composition and distribution in nanocomposites. The EDX images for $MgAl_2O_4$-1, $MgAl_2O_4$-2, $MgAl_2O_4$-3, and $MgAl_2O_4$-4 depict the respective elemental peaks, as shown in FIGS. 3A-3D. Further, FIGS. 4A-4C show the EDX elemental mapping of $MgAl_2O_4$-1 for magnesium (Mg), oxygen (O), and aluminum (Al) elements with a scale of 100 micrometers (μm). Similarly, FIGS. 4D-4H depict EDX elemental mapping of $MgAl_2O_4$-2, which identified Mg, O, Al, nickel (Ni), and cobalt (Co) elements with a scale of 100 μm. Further, images of $MgAl_2O_4$-3, as shown in FIGS. 4I-4M, provide the EDX elemental mapping for Mg, O, Al, Ni, and Co elements with a scale of 50 μm. The peaks for $MgAl_2O_4$-4 depict Mg, O, Al, Ni, and Co elements present with a scale of 50 μm, as shown in FIGS. 4N-4R. The results demonstrate the uniform distribution and presence of the respective elements in the synthesized nanocomposites, validating a successful incorporation of desired elements in the nanocomposites.

FTIR spectra and nitrogen ($N_2$)-adsorption desorption isotherms were recorded for $MgAl_2O_4$-1, $MgAl_2O_4$-2, $MgAl_2O_4$-3, and $MgAl_2O_4$-4 quadruple nanocomposites, as shown in FIG. 5A-5D. The vibrating bands below 1000 $cm^{-1}$ may be attributed to Al—O—Al symmetric and asymmetric stretching vibrations, in addition to Mg—O, Ni—O, and Co—O bonding. The doublet vibration peaks at 516 $cm^{-1}$ and 690 $cm^{-1}$ are allocated to the Mg—O—Al bond of spinel $MgAl_2O_4$ crystals. The broad peak at 3200 $cm^{-1}$ is attributed to O—H stretching vibrations, possibly from adsorbed water. Except for the $MgOAl_2O_3$-4 sample, the absence of peaks associated with carboxylic and/or amino groups indicate that the intermolecular spacer (GLN) was completely combusted and resulted in pure nanocomposites.

Figure 6:
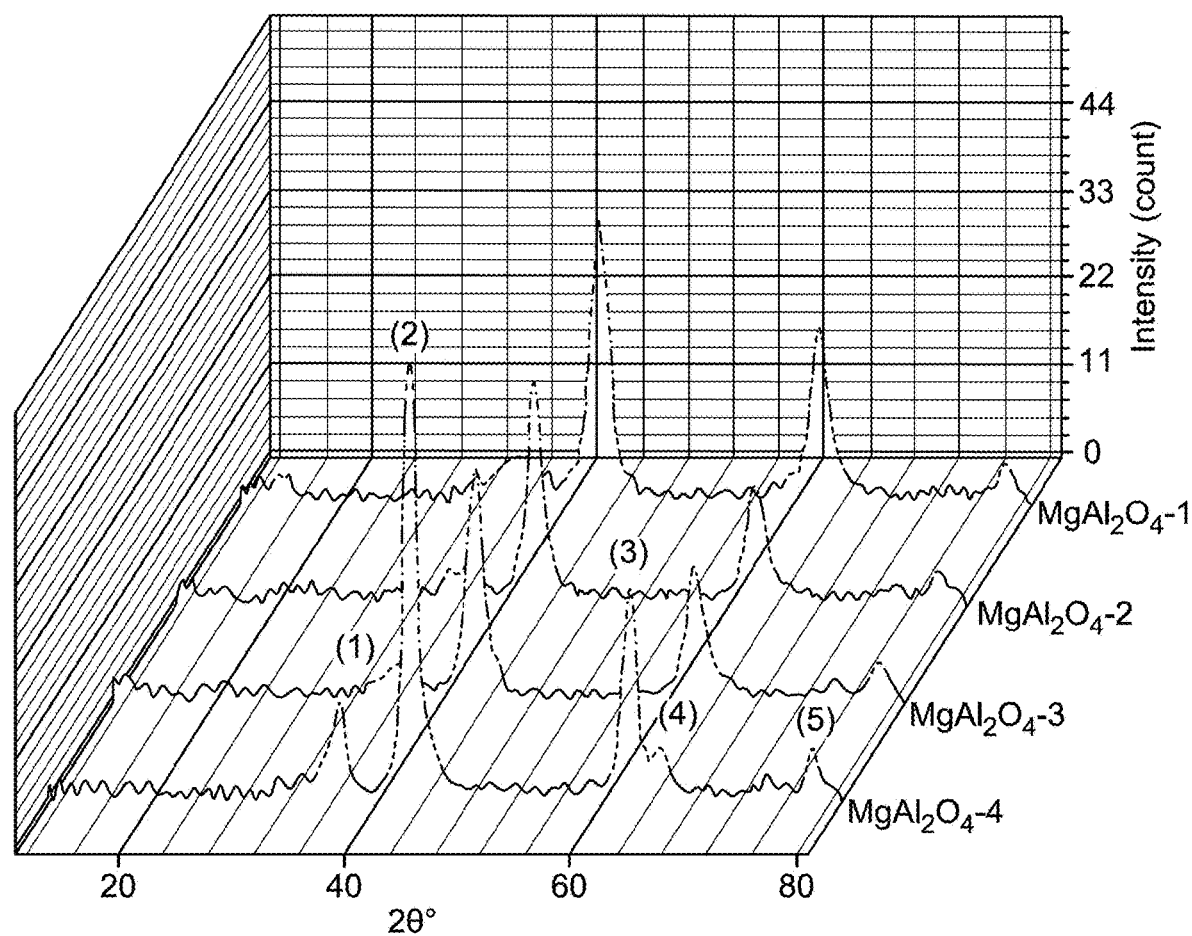
FIG. 6 depicts X-ray diffraction (XRD) patterns of $MgAl_2O_4$-1, $MgAl_2O_4$-2, $MgAl_2O_4$-3, and $MgAl_2O_4$-4, according to certain embodiments.

FIG. 6 illustrates XRD spectrophotometry patterns used to assess the crystallinity and phase of the synthesized nanocomposites. Further examination of the 2θ peak for the base material and quadruple nanocomposites at 36.6° 42.9°, 62.4°, 65.4°, and 78.7° was attributed to the $MgAl_2O_4$ spinel crystal planes (111), (200), (220), (311), and (222), respectively, as identified in the JCPDS (No. 01-077-1203). The two peaks at 2θ of 43.0° and 62.4° were used to evaluate the average lattice parameters, as listed in Table 2. The difference in intensity of each nanomaterial across the four samples provides insight into the crystal size. Both $MgAl_2O_4$-1 and $MgAl_2O_4$-4 exhibited peak intensities approximately twice as high as those of $MgAl_2O_4$-2 and $MgAl_2O_4$-3, indicating smaller crystals for the latter, which corroborated with the TEM findings. Furthermore, the absence of foreign XRD peaks in the $MgAl_2O_4$-1, $MgAl_2O_4$-2, $MgAl_2O_4$-3, and $MgAl_2O_4$-4 quadruple nanocomposite patterns indicate the purity of the synthesized nanocomposites. Furthermore, the absence of certain crystal face peaks may be due to the more amorphous nature of the prepared materials and/or the formation of long-range ordered heterostructures in the quadruple nanocomposites.

Example 4: Contact Time and Kinetic Evaluations

Figure 7A:
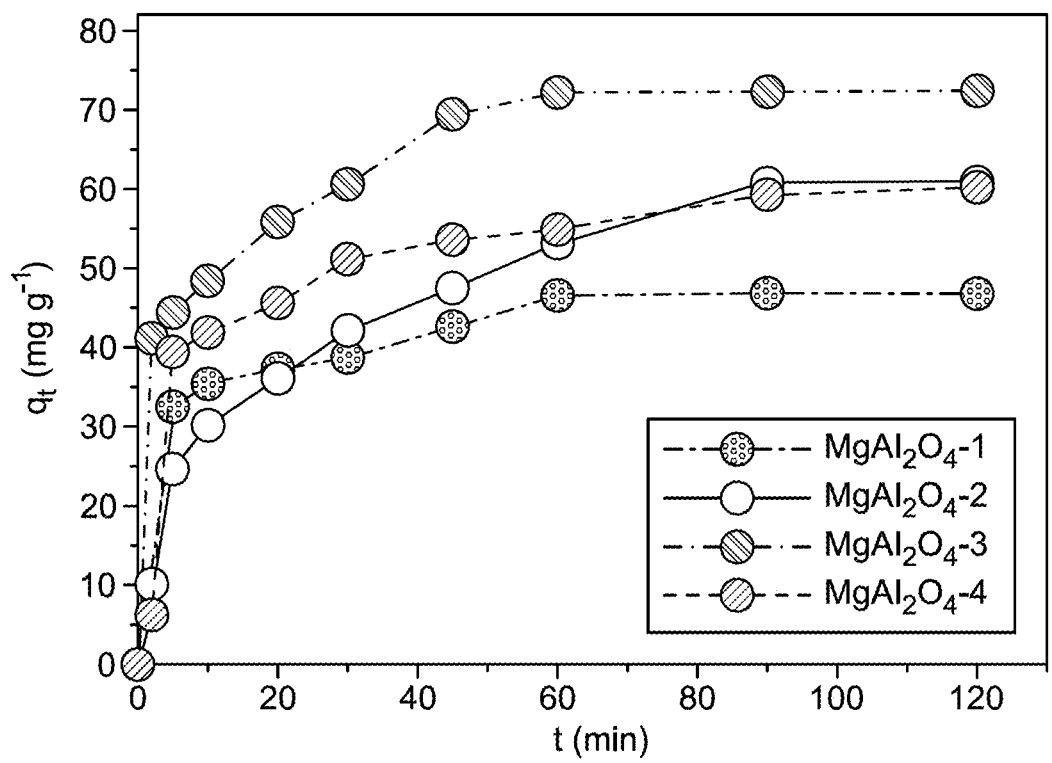
FIG. 7A depicts contact time results obtained after indigo carmine (INCR) removal by $MgAl_2O_4$-1, $MgAl_2O_4$-2, $MgAl_2O_4$-3, and $MgAl_2O_4$-4, from a 50 mg $L^{-1}$ INCR solution at 20° C., according to certain embodiments.

The influence of time on INCR removal by $MgAl_2O_4$-1, $MgAl_2O_4$-2, $MgAl_2O_4$-3, and $MgAl_2O_4$-4 nanocomposites is shown in FIG. 7A. The adsorption onto the four sorbents occurred rapidly advanced and achieved equilibrium within 90 minutes. $MgAl_2O_4$-1, $MgAl_2O_4$-2, $MgAl_2O_4$-3, and $MgAl_2O_4$-4 exhibited a quantity of dye absorbed at a time ($q_t$) values of 46.79 milligrams per gram (mg $g^{-1}$), 60.89 mg $g^{-1}$, 72.43 mg $g^{-1}$, and 60.22 mg $g^{-1}$, respectively. The observations were consistent with $MgAl_2O_4$-3 having the greatest $q_t$ value and having the greatest surface area, as listed in Table 3. Observations within the first 2.0 minutes demonstrate that $MgAl_2O_4$-1, $MgAl_2O_4$-2, $MgAl_2O_4$-3, and $MgAl_2O_4$-4 achieved a 10%, 20%, 60%, and 20% of INCR uptake, respectively. $MgAl_2O_4$-3 exhibits the greatest surface area compared to the other three nanocomposites. The contact time outcomes were employed for inspecting the INCR sorption kinetics onto $MgAl_2O_4$-1, $MgAl_2O_4$-2, $MgAl_2O_4$-3, and $MgAl_2O_4$-4. The sorption order was analyzed using original nonlinear equations of the order from the kinetic model, which includes pseudo-first order (NLPF, equation 5) and pseudo-second order (NLPS, equation 6) [Harrache, Z. et al., Thermodynamic and kinetics studies on adsorption of Indigo Carmine from aqueous solution by activated carbon, *Microchemical Journal*, 2019, 144, 180-189, which is incorporated herein by reference in its entirety]. Furthermore, diffusion models, such as liquid film diffusion (LD, equation 7) and intra-particle diffusion (ID, equation 8), have been employed for inspecting the INCR rate-control mechanism.

$$Q_t = q_e(1 - \exp^{-K_1 \cdot t}) \qquad (5)$$

$$q_t = \frac{k_2 \cdot q_e^2 \cdot t}{1 + k_2 \cdot q_e \cdot t} \qquad (6)$$

$$q_t = K_{IP} * t^{\frac{1}{2}} + C_i \qquad (7)$$

$$\ln(1 - F) = -K_{LF} * t \qquad (8)$$

Figure 7B:
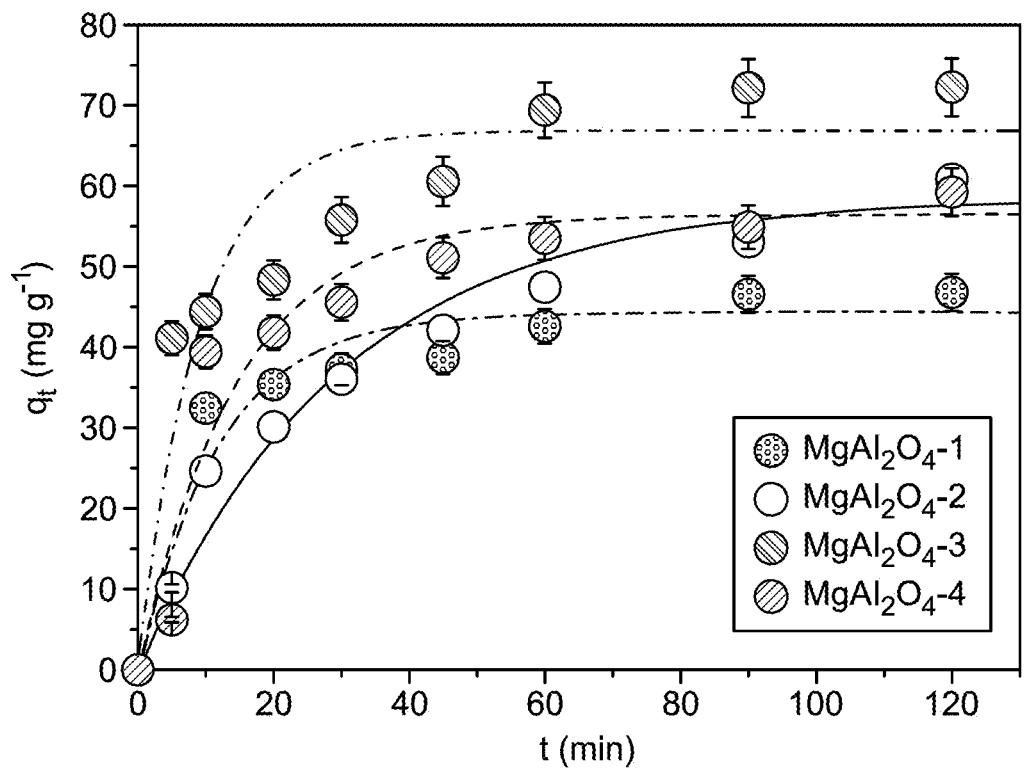
FIG. 7B is a non-linear pseudo-first order (NLPF) plot for INCR removal using $MgAl_2O_4$-1, $MgAl_2O_4$-2, $MgAl_2O_4$-3, and $MgAl_2O_4$-4, from a 50 mg $L^{-1}$ INCR solution at 20° C., according to certain embodiments.
Figure 7C:
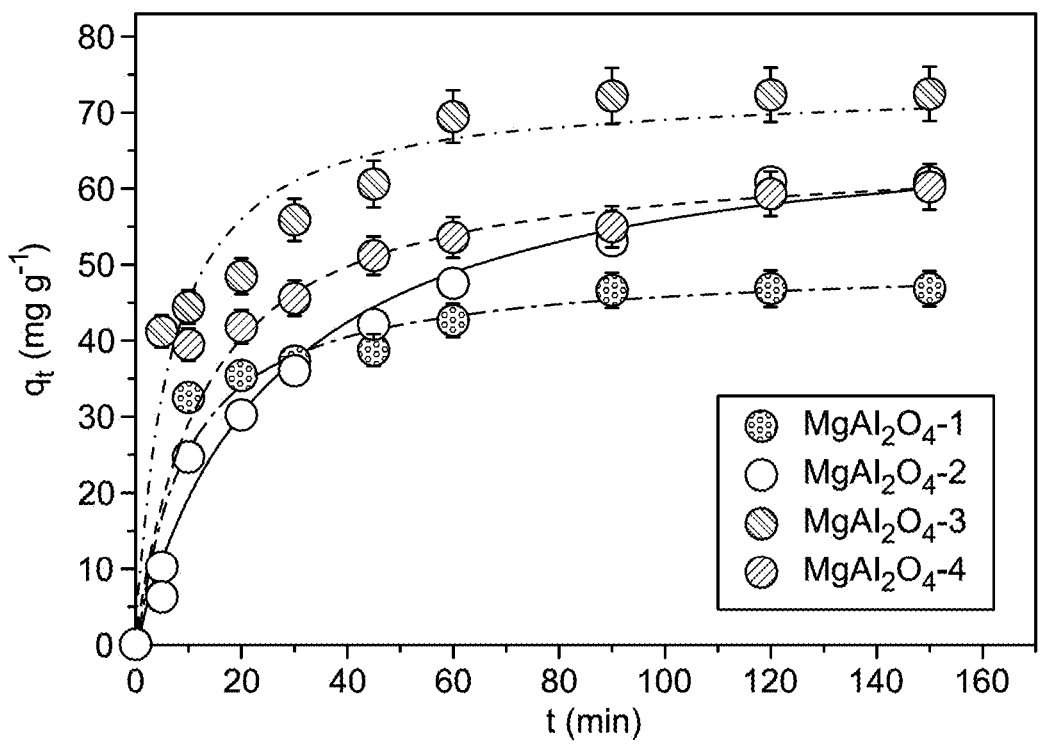
FIG. 7C is a non-linear pseudo-second order (NLPS) plot for INCR removal using $MgAl_2O_4$-1, $MgAl_2O_4$-2, $MgAl_2O_4$-3, and $MgAl_2O_4$-4, from a 50 mg $L^{-1}$ INCR solution at 20° C., according to certain embodiments.

Rate constants of NLPF and NLPS are denoted by $k_1$ per minute ($min^{-1}$) and $k_2$ grams per milligram per minute (g $mg^{-1}$ $min^{-1}$); however, those of LD and IP are denoted by $k_{LF}$ ($min^{-1}$) and $k_{IP}$ (mg $g^{-1}$ $min^{-0.5}$). The slope and intercept of the NLPF and NLPS plots are shown in FIG. 7B and FIG. 7C, respectively. The observations were utilized for computing the $k_1$ and $k_2$ magnitudes, as listed in Table 4. The

TABLE 2

XRD result of the as-synthesized $MgAl_2O_4$-1, $MgAl_2O_4$-2, $MgAl_2O_4$-3, and $MgAl_2O_4$-4 quadruple nanocomposites

Figure 7D:
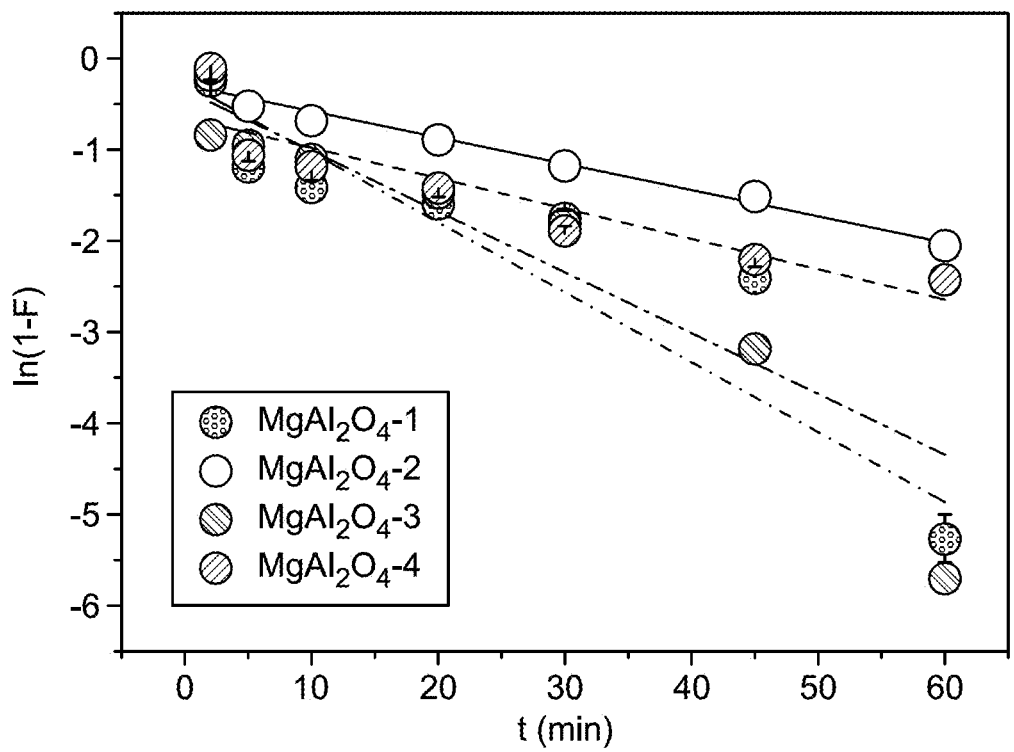
FIG. 7D is an intra-particle diffusion (ID) plot for INCR removal using $MgAl_2O_4$-1, $MgAl_2O_4$-2, $MgAl_2O_4$-3, $MgAl_2O_4$-4 from a 50 mg $L^{-1}$ INCR solution at 20° C., according to certain embodiments.
Figure 7E:
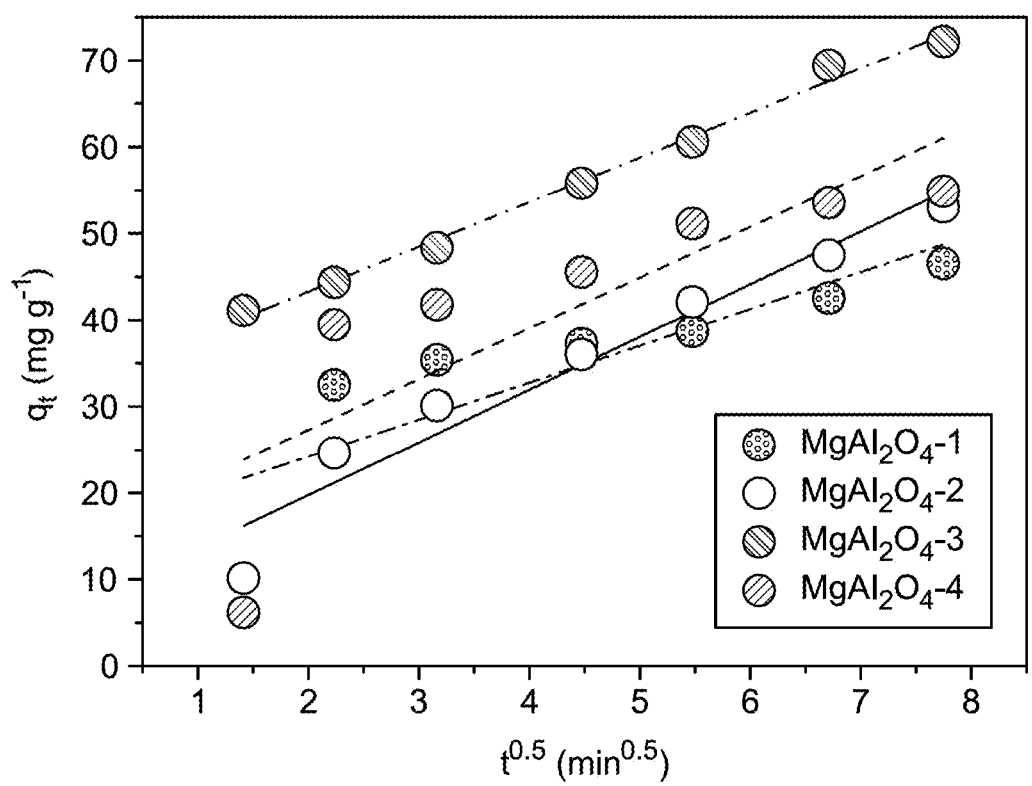
FIG. 7E is a liquid diffusion (LD) plot for INCR removal using $MgAl_2O_4$-1, $MgAl_2O_4$-2, $MgAl_2O_4$-3, $MgAl_2O_4$-4, from a 50 mg $L^{-1}$ INCR solution at 20° C., according to certain embodiments.

| Parameter | | 2θ (°) | $MgAl_2O_4$-1 | $MgAl_2O_4$-2 | $MgAl_2O_4$-3 | $MgAl_2O_4$-4 |
|---|---|---|---|---|---|---|
| D | peak 1 | 42.9423 | 3.6912 | 4.1674 | 3.0883 | 5.6675 |
|   | peak 2 | 62.4233 | 3.1735 | 3.1952 | 3.7936 | 4.5682 |
|   | avg    |         | 3.4324 | 3.6813 | 3.4410 | 5.1179 |
| a | peak 1 | 42.8016 | 0.0325 | 0.0328 | 0.0328 | 0.0326 |
|   | peak 2 | 62.3195 | 0.0460 | 0.0462 | 0.0462 | 0.0461 |
|   | avg    |         | 0.0392 | 0.0395 | 0.0395 | 0.0393 |
| c | peak 1 | 43.26408 | 0.4209 | 0.4222 | 0.4179 | 0.4208 |
|   | peak 2 | 62.6287 | 0.2973 | 0.2977 | 0.2964 | 0.2974 |
|   | avg    |         | 0.3591 | 0.3600 | 0.3572 | 0.3591 |
| ε | peak 1 | 42.9519 | 0.0081 | 0.0072 | 0.0097 | 0.0053 |
|   | peak 2 | 62.4029 | 0.0080 | 0.0079 | 0.0067 | 0.0056 |
|   | avg    |         | 0.0081 | 0.0076 | 0.0082 | 0.0054 | correlation coefficient ($R^2$) was regarded as a criterion in establishing the best-fitted model, with the residual sum of squares and reduced Chi-square used as further evaluation parameters. The data extracted from the fittings of the INCR sorption onto the four fabricated sorbents indicate better agreement with the NLPS, where the higher $R^2$ values were supported with lower $X^2$ values, as listed in Table 3. The data support the ability of $MgAl_2O_4$-1, $MgAl_2O_4$-2, $MgAl_2O_4$-3, and $MgAl_2O_4$-4 surfaces to sorb multilayered molecules, not only at localized sorbent sites but also through interactions between the sorbed molecules. The plots obtained for ID and LD for INCR sorption onto $MgAl_2O_4$-1, $MgAl_2O_4$-2, $MgAl_2O_4$-3, and $MgAl_2O_4$-4 are shown in FIG. 7D and FIG. 7E, respectively. The findings collected in Table 3 indicate that liquid film diffusion (LD) controlled the INCR sorption onto the fabricated quadrable nanocomposites with higher $R^2$ values and with $X^2$ and RSS values lower than those of IP fittings by approximately 50- to 200-fold. In addition, the $C_1$ values above zero for the four nanocomposites are an additional factor implying the sorption disagreement with the ID model. The INCR sorption being controlled by the LD model indicates a high affinity of the pollutant toward the quadrable nanocomposites.

to the disintegration of $MgAl_2O_4$-3 clusters and the creation of virgin active surface sites. Elevating the 100 mg $L^{-1}$ INCR solution temperature lifted the $q_t$ of $MgAl_2O_4$-3 from 58.9 mg $g^{-1}$ to 110.6 mg $g^{-1}$, determining that INCR adsorption by $MgAl_2O_4$-3 was endothermic. Further, analyzed results indicated the effectiveness of $MgAl_2O_4$-3 for treating INCR-contaminated effluents with concentrations resembling wastewater and industrial wastewater limits. For further evaluation of the INCR sorption onto the $MgAl_2O_4$-3, the Langmuir model (LM), the Freundlich model (FM), and the Dubinin-Radushkevich model (DRM) were used at a temperature of about 293 K. The postulation of single-layered sorption with no sorbate-sorbate interaction was evaluated using LM as provided in equation 9, the multilayer sorption possibility was inspected via the FM as provided in equation 10, and the DRM, as provided in equation 11, was used to determine physisorption/chemisorption nature. The Polanyi potential (F, kJ $mol^{-1}$) was computed as provided equation 12, where the ideal gas constant was R=0.0081345 kJ $mol^{-1}$. In addition, the energy required to detach an INCR molecule from the $MgAl_2O_4$-3 site to infinity was calculated using the Dubinin energy ($E_D$), kilojoules per mole (kJ $mole^{-1}$), as provided in equation 13.

TABLE 3

Kinetic results of INCR sorption onto $MgAl_2O_4$-1, $MgAl_2O_4$-2, $MgAl_2O_4$-3, and $MgAl_2O_4$-nanocomposites

| | | Adsorption rate order | | | | | | | | | |
|---|---|---|---|---|---|---|---|---|---|---|---|
| | | NLPF | | | | | NLPS | | | | |
| Sorbent | qm exp (mg $g^{-1}$) | qe (mg · $g^{-1}$) | $K_1$ | $R^2$ | $X^2$ | RSS | $q_e$ (mg $g^{-1}$) | $K_2$ | $R^2$ | $X^2$ | RSS |
| $MgAl_2O_4$-1 | 46.793 | 44.363 | 0.083 | 0.943 | 16.545 | 132.360 | 50.151 | 0.002 | 0.953 | 13.658 | 109.261 |
| $MgAl_2O_4$-2 | 60.893 | 58.677 | 0.033 | 0.970 | 14.515 | 116.121 | 70.895 | 0.001 | 0.987 | 6.364 | 50.908 |
| $MgAl_2O_4$-3 | 72.435 | 66.892 | 0.110 | 0.891 | 61.357 | 490.855 | 73.383 | 0.002 | 0.955 | 25.088 | 200.708 |
| $MgAl_2O_4$-4 | 60.217 | 56.508 | 0.068 | 0.931 | 35.359 | 282.870 | 64.880 | 0.001 | 0.933 | 34.004 | 272.028 |

| | | Adsorption mechanism | | | | | | | |
|---|---|---|---|---|---|---|---|---|---|
| | | ID | | | | LD | | | |
| Sorbent | $K_{IP}$ (mg $g^{-1}$ $min^{1/2}$) | C (mg · $g^{-1}$) | $R^2$ | $X^2$ | RSS | $K_{LF}$ ($min^{-1}$) | $R^2$ | $X^2$ | RSS |
| $MgAl_2O_4$-1 | 2.968 | 0.398 | 0.775 | 12.448 | 99.585 | 0.067 | 0.831 | 0.067 | 2.555 |
| $MgAl_2O_4$-2 | 2.437 | 5.101 | 0.682 | 13.498 | 107.987 | 0.029 | 0.978 | 0.066 | 0.053 |
| $MgAl_2O_4$-3 | 2.192 | 8.660 | 0.708 | 9.629 | 77.034 | 10.077 | 0.896 | 0.009 | 1.929 |
| $MgAl_2O_4$-4 | 1.819 | 12.115 | 0.707 | 6.664 | 53.312 | 0.033 | 0.841 | 0.026 | 0.592 |

Example 5: Sorption Equilibria

Figure 8A:
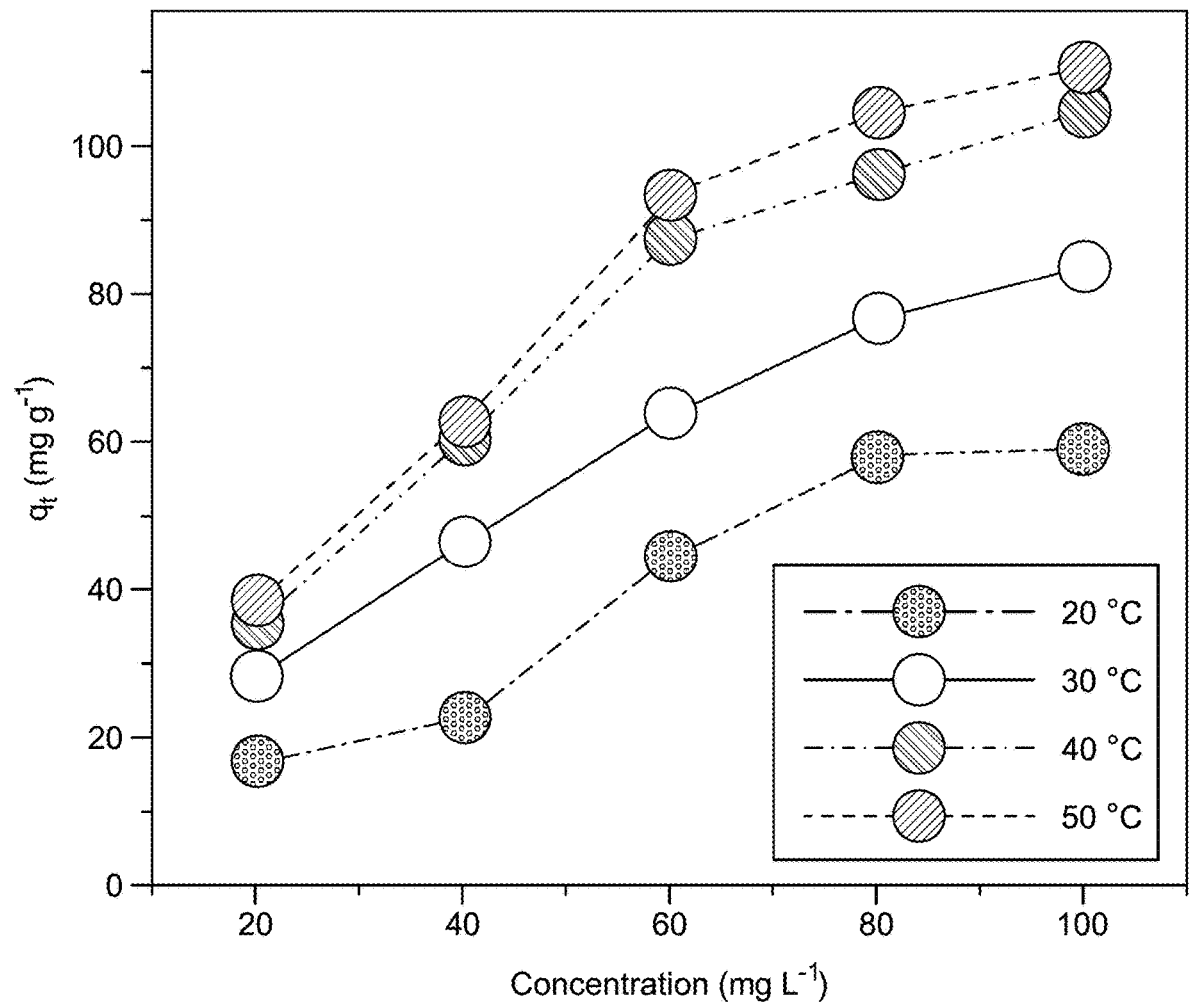
FIG. 8A depicts effects of concentration and temperature on INCR sorption, at a concentration of 20° C. to 100° C. and a temperature of 293 kelvin (K) to 323 K, according to certain embodiments.

Based on the contact time output, $MgAl_2O_4$-3 was selected as the best sorbent among the synthesized nanocomposites. Therefore, the INCR concentration impact on the sorption by $MgAl_2O_4$-3 was inspected, as shown in FIG. 8A. The $q_t$ value increased proportionally as the concentrations rose from 20 mg $L^{-1}$ to 80 mg $L^{-1}$. The sorption line increases with concentration, indicating an unsuitability of the sorbent dose to treat more than 80 mg $L^{-1}$ with such a solution to sorbent ratio. Raising the INCR solution temperature from 293 kelvin (K) to 323 K increased the sorption efficiency. Removal of 20 mg $L^{-1}$ of INCR shifted from 44% at 293 K to 96% at 323 K. Obtained results may be attributed $$q_e = \left(\frac{K_1 q_m C_e}{1 + q_m C_e}\right) \quad (9)$$

$$q_e = K_F \cdot C_e^{1/n} \quad (10)$$

$$q_e = q_m e^{-K_D \varepsilon^2} \quad (11)$$

$$\varepsilon = RT\ln\left(1 + \frac{1}{C_e}\right) \quad (12)$$

$$E_D = (2K_D)^{-0.5} \quad (13)$$

Figure 8B:
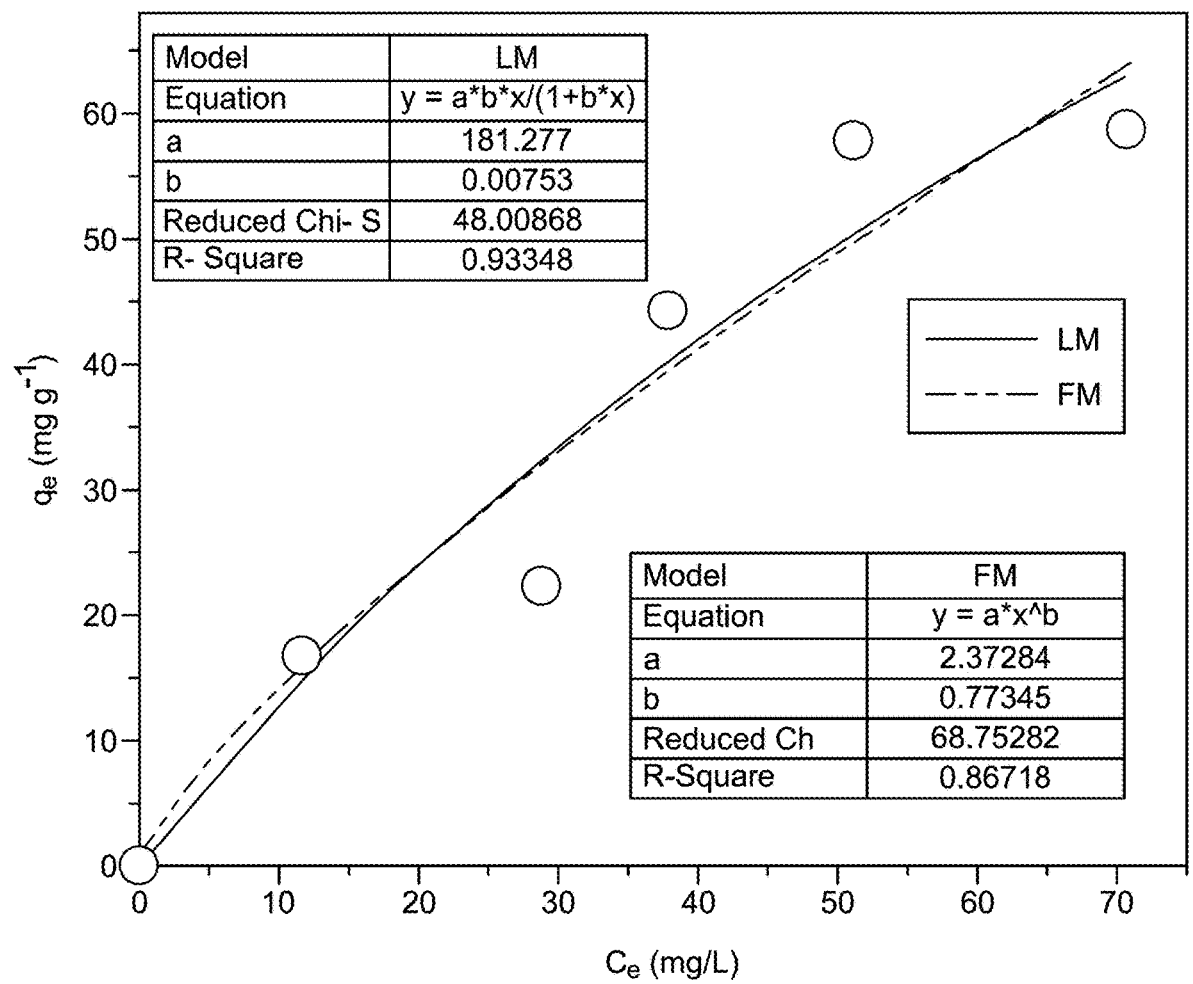
FIG. 8B depicts Langmuir model (LM) and Freundlich model (FM) fittings, according to certain embodiments.
Figure 8C:
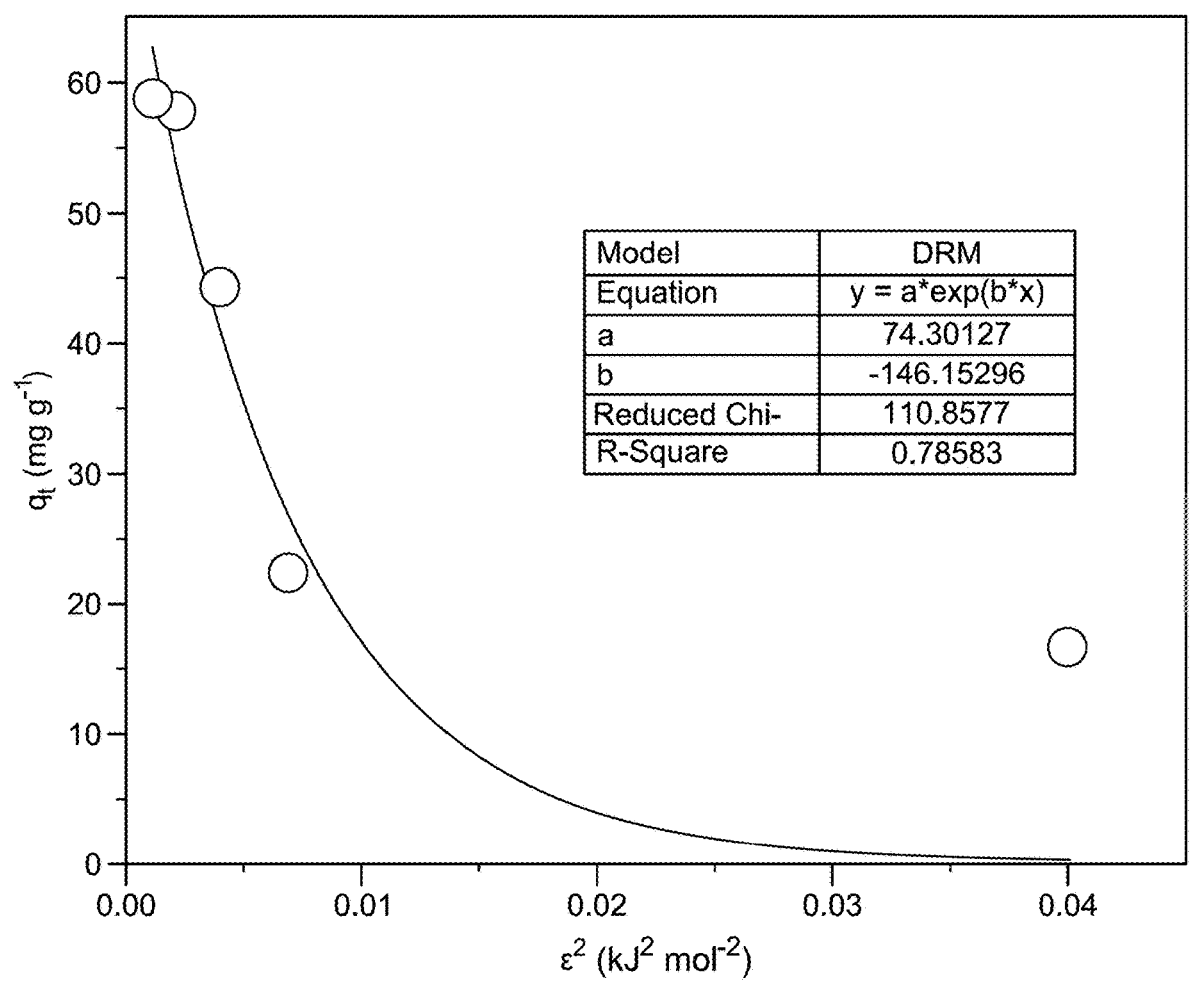
FIG. 8C depicts a plot of Dubinin-Radushkevich model (DRM), according to certain embodiments.
Figure 8D:
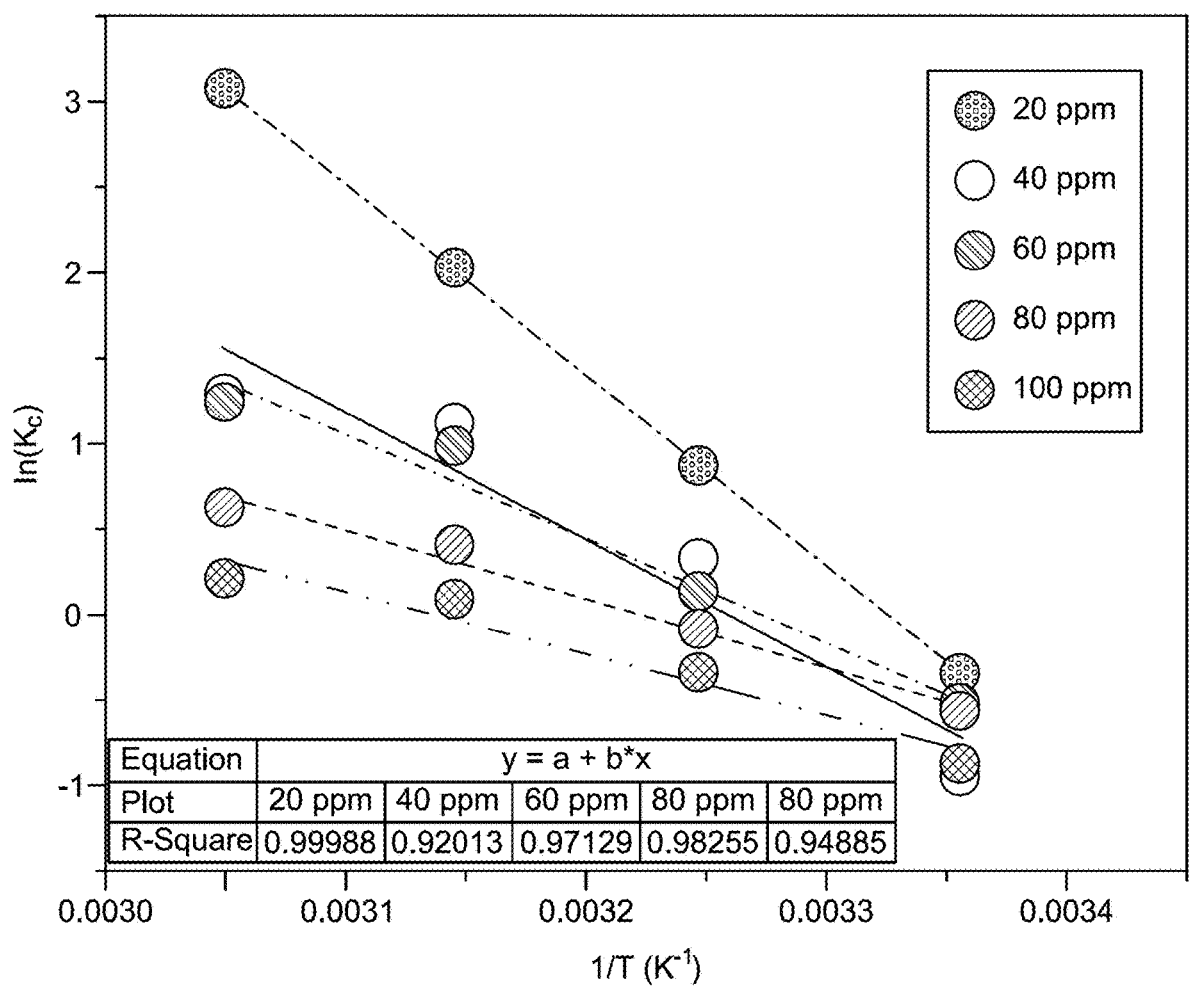
FIG. 8D depicts a thermodynamic plot based on concentration and temperature, according to certain embodiments.

Ce (mg $L^{-1}$) is INCR concentration, $q_m$ is the maximum $q_t$, $K_L$ (L $mg^{-1}$) is the LM constant, $K_F$ (L·$g^{-1}$) is the FM constant, and 1/n is the favorability factor. The Dubinin constant ($K_D$), ($kJ^2$ $mol^{-2}$) was derived from the slope. The collective nonlinear plots of Langmuir model (LM) and Freundlich model (FM) are shown in FIG. 8B. The DRM observations of INCR adsorption onto $MgAl_2O_4$-3 are shown in FIG. 8C, and the results of the three models are listed in Table 4. The fitting outcomes indicate that INCR sorption onto $MgAl_2O_4$-3 agreed more with the LM, which predicted the capability of one gram of $MgAl_2O_4$-3 to remove up to 181.278 milligrams of INCR. Furthermore, the less than unity value of 1/n implied that INCR sorption onto $MgAl_2O_4$-3 was favorable. the $E_D$ value 0.058 kJ $mol^{-1}$ suggested that $MgAl_2O_4$-3 removed INCR via a physisorption, which is considered a positive outcome since it implied the ease of $MgAl_2O_4$-3 regeneration. Thermodynamics were examined to enhance comprehension of the INCR adsorption onto $MgAl_2O_4$-3. The results of INCR removal from the concentrations at 293 K, 303 K, 313 K, and 323 K were employed for that purpose. The entropy ($\Delta S°$) and enthalpy ($\Delta H°$) were determined from equation 14 and the plot shown in FIG. 8D. Gibbs free energy ($\Delta G°$) was determined from equation 15. Thermodynamic outcomes are listed in Table 4.

$$\ln K_c = \frac{\Delta H°}{RT} + \frac{\Delta S°}{R} \quad (14)$$

$$\Delta G° = \Delta H° - T\Delta S° \quad (15)$$

Figure 9A:
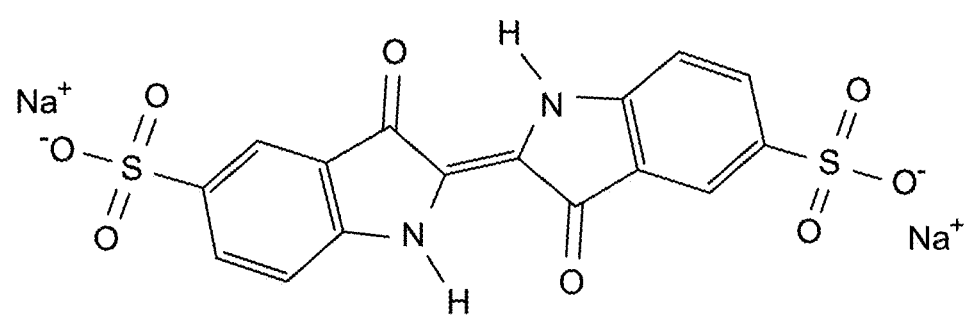
FIG. 9A depicts INCR structure, according to certain embodiments.
Figure 9B:
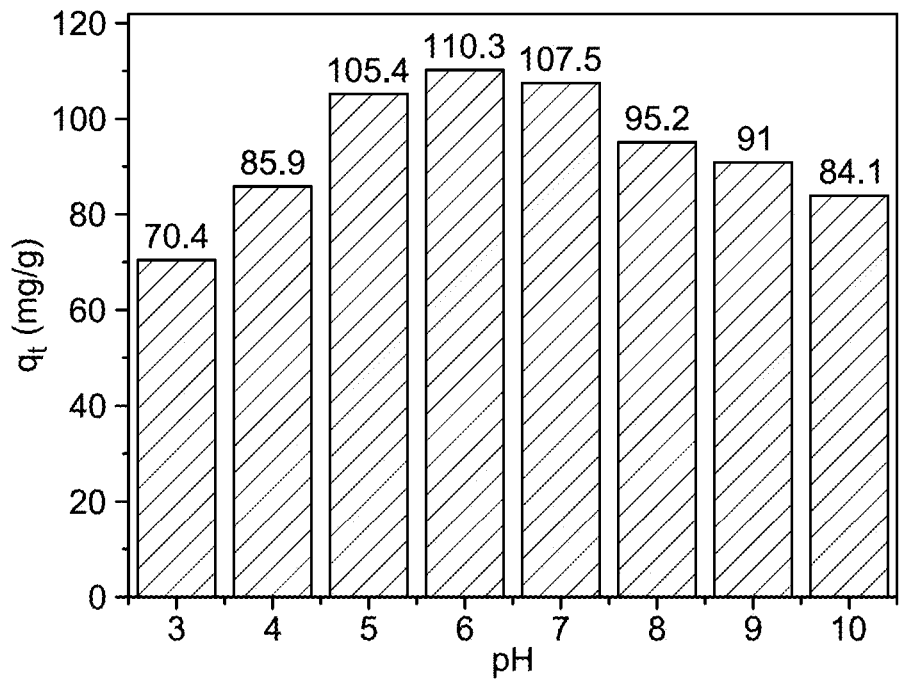
FIG. 9B is a graph depicting impact of pH on INCR sorption on $MgAl_2O_4$-3, according to certain embodiments.

Positive $\Delta H°$ and $\Delta G°$ values at 293 K reflect that the INCR sorption by $MgAl_2O_4$-3 was endothermic and nonspontaneous within all tested INCR concentrations. Elevating the temperature to 313 K and 323 K shifted the INCR adsorption by $MgAl_2O_4$-3 to become spontaneous. The rise in the negative $\Delta G°$ values with decreasing initial concentration is promising for utilizing the sorbents in water treatment applications, particularly when dealing with low pollutant concentrations.

groups with a sum of eight oxygen and two nitrogen atoms, which were considered electron-rich and partially negative sites, as shown in FIG. 9A. pH influence on INCR sorption by the $MgAl_2O_4$-3 quadruple nanocomposite was examined. As shown in FIG. 9B, a pH of 6.0 achieved the greatest removal of INCR with the $MgAl_2O_4$-3 nanocomposite. At severe alkaline conditions, a competition may take place between INCR and the highly available ·OH at $MgAl_2O_4$-3 active sites. Furthermore, INCR molecules may be repelled via their electron-rich groups by the ·OH on the $MgAl_2O_4$-3 surface, which may explain the drop in sorption efficiency above pH 7.0. At low pH, where $H^+$ is abundant around the $MgAl_2O_4$-3 and the nanocomposite may be protonated, a repulsion of the electron-rich sites of INCR from the $MgAl_2O_4$-3 surface may occur. While both excessive acidity and extreme alkalinity were disadvantageous, the highly alkaline environment possessed less retardation to the INCR sorption process over the extremely acidic conditions.

Example 7: Applications

Figure 9C:
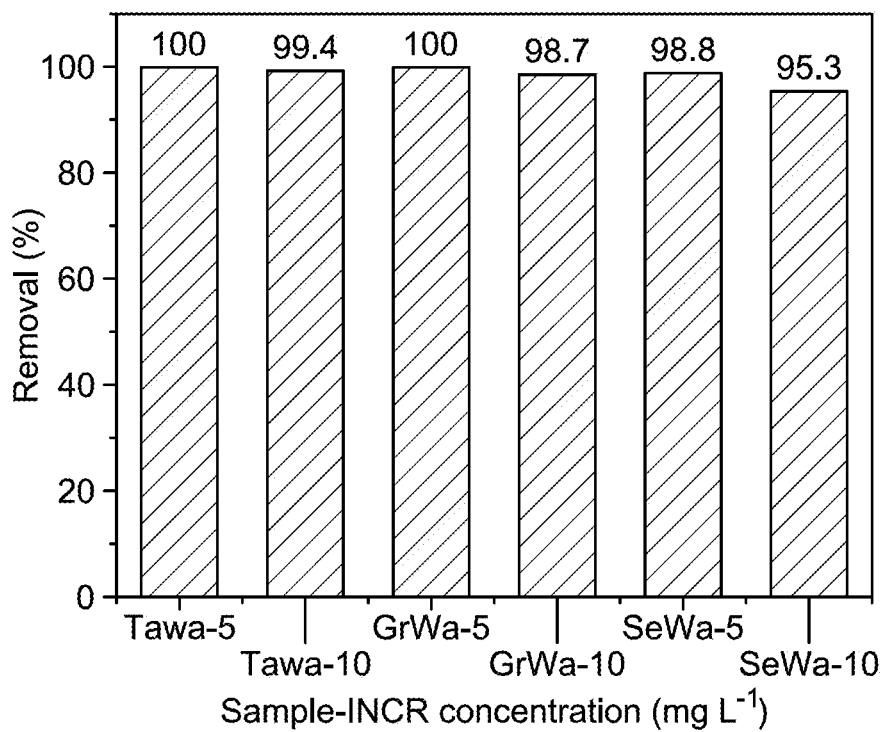
FIG. 9C is a graph depicting use of $MgAl_2O_4$-3 for decontaminating water samples spiked with INCR, according to certain embodiments.

Natural samples of tap water (TaWa), ground water (GrWa), and sewage water (SeWa) have TDS values of 0.46 g $L^{-1}$, 0.89 g $L^{-1}$, and 33.28 g $L^{-1}$, and temperatures of 24.5° C., 25.5° C., and 25.5° C., and pH values of 6.8, 7.3, and 6.5, respectively. The natural water pH was close to the desirable pH; therefore, the samples were treated as picked from sources with a heating step carried out at 40° C. to facilitate sorption as indicated by thermodynamics results. The efficiency of $MgAl_2O_4$-3 in removing INCR from TaWa, GrWa, and SeWa were monitored and noted, as shown in FIG. 9C. The reduction in the removal of INCR from SeWa compared to TaWa and GrWa may be attributed to the elevated saline concentration in the SeWa, which may block some $MgAl_2O_4$-3 active sorption sites and/or slow down the INCR solution diffusion movement toward the $MgAl_2O_4$-3 surface.

TABLE 4

Isotherms results of INCR sorption by $MgAl_2O_4$-3 using concentrations ranging from 20 mg $L^{-1}$ to 100 mg $L^{-1}$ at 293 K, and the subsequent thermodynamic results

| Adsorption isotherms | | | | | | | | | |
|---|---|---|---|---|---|---|---|---|---|
| Langmuir | | | Freundlich | | | | DRM | | |
| $R^2$ | $K_L$ | $q_m$ | $R^2$ | $K_f$ | 1/n | $q_m$ | $K_{DR}$ | E | $R^2$ |
| 0.933 | 0.008 | 181.278 | 0.867 | 2.373 | 0.773 | 74.301 | 146.153 | 0.058 | 0.786 |

| Thermodynamic results | | | | | | | |
|---|---|---|---|---|---|---|---|
| Conc. (mg $L^{-1}$) | $\Delta H°$ | $\Delta S°$ | $\Delta G°$ (293 K) | $\Delta G°$ @ 303 K | $\Delta G°$ @ 313 K | $\Delta G°$ @ 323 K | $R^2$ |
| 20.0 | 93.142 | 0.310 | 0.842 | −2.255 | −5.353 | −8.450 | 1.000 |
| 40.0 | 61.670 | 0.201 | 1.771 | 0.239 | −2.250 | 4.260 | 0.920 |
| 60.0 | 50.793 | 0.166 | 1.243 | −0.419 | 2.082 | 3.745 | 0.971 |
| 80.0 | 33.388 | 0.108 | 1.318 | 0.242 | −0.834 | −1.910 | 0.983 |
| 100.0 | 30.111 | 0.094 | 1.963 | 1.019 | −0.074 | −0.871 | 0.949 |

Example 6: Effect of pH

The solution pH substantially impacts the polarity and electron availability of the sorbent, influencing the occurrence of electrostatic attraction or repulsion between the sorbent and sorbate, which has an impact on the ability of the sorbent to remove contaminants. INCR features several polar sites, such as carbonyl, amine, and sulfonic acid Aspects of present disclosure provide the nanocomposites, a process of production thereof, and a method of dye removal thereof. $MgAl_2O_4$-based quadruple nanocomposites were synthesized as low-cost, environmentally friendly sorbents using GLN as a green capping agent via a one-pot synthesis route. The nanocomposites were labelled as $MgAl_2O_4$-1, $MgAl_2O_4$-2, $MgAl_2O_4$-3, and $MgAl_2O_4$-4, which showed average particle sizes of 8.5 nm, 7.6 nm, 2.8 nm, and 6.5 nm, respectively, with particle size ranges of 3.8 nm to 28.7 nm, 1.7 nm to 26.0 nm, 1.4 nm to 13.3 nm, and 2.8 nm to 17.6 nm, respectively. EDX elemental analysis showed no foreign peaks, implying the purity of $MgAl_2O_4$ and its quadruple-based nanocomposites. In addition, EDX elemental mapping illustrated that the elemental constituents were homogeneously distributed throughout the nanocomposites. $MgAl_2O_4$-1, $MgAl_2O_4$-2, $MgAl_2O_4$-3, and $MgAl_2O_4$-4 showed surface areas of 75.409 $m^2\ g^{-1}$, 118.465 $m^2\ g^{-1}$, 141.073 $m^2\ g^{-1}$, and 122.984 $m^2\ g^{-1}$, respectively, which exhibiting $q_t$ values of about 46.79 mg $g^{-1}$, 60.89 mg $g^{-1}$, 72.43 mg $g^{-1}$, and 60.22 mg $g^{-1}$, respectively, within 90 minutes. pH 6.0 was used for the removal of INCR removal on $MgAl_2O_4$-3. Kinetically, the INCR sorption onto $MgAl_2O_4$-1, $MgAl_2O_4$-2, $MgAl_2O_4$-3, and $MgAl_2O_4$-4 showed better agreement with the NLPS, and the LD possessed a majority control on INCR sorption by the quadrable nanocomposites with higher $R^2$ values and the $X^2$ and RSS of the LD lesser than those of ID by about 50 to 200 times. Moreover, the Ci values above zero for the four nanocomposites are an additional factor implying the sorption disagreement with the ID model. The $q_t$ increased proportionally with 20 mg $L^{-1}$ to 80 mg $L^{-1}$ INCR concentrations. Line inflation was noticed with a concentration of 100 mg $L^{-1}$, indicating the sorbent was suitable to treat up to 80 mg $L^{-1}$ with the solution-sorbent doses of the present disclosure. Raising the INCR solution temperature from 293 K to 323 K increased INCR removal efficiency from 44% to 96% for an INCR concentration of 20 mg $L^{-1}$. At a temperature of 323 K, a $q_t$ value increased from 58.9 mg $g^{-1}$ to 110.6 mg $g^{-1}$ at INCR concentrations of 20 mg $L^{-1}$ to 100 mg $L^{-1}$, indicating cluster disintegrations and virgin active sorption sites liberation and the sorption is endothermic. The INCR sorption at 293 K transformed to spontaneous when INCR-contaminated water was heated to 313 K. The $\Delta G°$ values became more negative with a 20 mg $L^{-1}$ INCR concentration, highlighting $MgAl_2O_4$-3 as an effective sorbent for treating polluted water sources, especially in cases of low INCR concentrations. The lowering of $\Delta G°$ values as INCR initial concentration decreases was considered favorable for employing $MgAl_2O_4$-3 in water treatment applications where INCR concentrations are low. Natural water samples of TaWa, GrWa, and SeWa were treated without pH adjustment, as they were close to the desirable pH. INCR removal was conducted at 313 K, as nominated by the thermodynamic results, and the $MgAl_2O_4$-3 possessed an average removal of 97.1% with a range of 95.4% to 100% and a standard deviation of 2.4%.

Numerous modifications and variations of the present disclosure are possible in light of the above teachings. Therefore, it is to be understood that within the scope of the appended claims, the disclosure may be practiced other than as specifically described herein.

The invention claimed is:

1. A nanocomposite, comprising:
   $MgAl_2O_4$;
   1 to 2.5 weight percent (wt. %) nickel oxide; and
   1 to 10 wt. % cobalt oxide;
   wherein the nickel oxide and the cobalt oxide are doped in the $MgAl_2O_4$,
   wherein the nanocomposite is in the form of particles having an average particle size of 1 to 8 nm,
   wherein the nanocomposite has a surface area of 100 to 145 $m^2$/g.

2. The nanocomposite of claim 1, wherein the nanocomposite is porous and has an average pore size of 65 to 90 Å, and wherein the nanocomposite does not contain carbon.

3. The nanocomposite of claim 1, wherein the nanocomposite is made by a process comprising:
   mixing gelatin, an aluminum salt, a magnesium salt, a nickel salt, and a cobalt salt in water to form a solution;
   heating the solution to form a solid; and
   calcinating the solid at a temperature of 500 to 600° C. for 3 to 5 hours to form the nanocomposite.

4. The nanocomposite of claim 1, wherein the nanocomposite has a hexagonal shape with a longest dimension of 50 nm to 500 nm.

* * * * *